(12) United States Patent
Ida et al.

(10) Patent No.: US 11,221,684 B2
(45) Date of Patent: Jan. 11, 2022

(54) INFORMATION PROCESSING DEVICE, INFORMATION PROCESSING METHOD, AND RECORDING MEDIUM

(71) Applicant: SONY CORPORATION, Tokyo (JP)

(72) Inventors: Kentaro Ida, Tokyo (JP); Seiji Suzuki, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/770,681

(22) PCT Filed: Oct. 5, 2018

(86) PCT No.: PCT/JP2018/037291
§ 371 (c)(1),
(2) Date: Jun. 8, 2020

(87) PCT Pub. No.: WO2019/116692
PCT Pub. Date: Jun. 20, 2019

(65) Prior Publication Data
US 2021/0165503 A1 Jun. 3, 2021

(30) Foreign Application Priority Data
Dec. 15, 2017 (JP) .............................. JP2017-240512

(51) Int. Cl.
*G06F 3/0346* (2013.01)
*G06F 3/01* (2006.01)
(Continued)

(52) U.S. Cl.
CPC ............ *G06F 3/0346* (2013.01); *G06F 3/017* (2013.01); *G06F 3/167* (2013.01); *H04N 9/3141* (2013.01)

(58) Field of Classification Search
CPC .......... G06F 3/017; G06F 3/013; G06F 3/005; G06F 3/011; G06F 3/0304; G06F 3/0346; G06F 3/167; H04N 9/3141
See application file for complete search history.

(56) References Cited

U.S. PATENT DOCUMENTS 9,723,293 B1 8/2017 Cederlof
10,388,225 B2* 8/2019 Pyeon .................. G09G 3/3233
(Continued)

FOREIGN PATENT DOCUMENTS

EP 2421252 A1 2/2012
EP 3089011 A1 11/2016
(Continued)

*Primary Examiner* — Koosha Sharifi-Tafreshi
(74) *Attorney, Agent, or Firm* — Paratus Law Group, PLLC

(57) ABSTRACT

There is provided an information processing device to improve convenience by performing display in which a target device selected as an operation target and an operation user can be visually recognized. The information processing device includes a display control unit that controls, based on position information of a target device in a predetermined real space and position information of a user having an operation authority for the target device, display corresponding to a positional relation between the user and the target device such that the user can visually recognize the display in the real space. Consequently, it is possible to improve convenience by performing display in which a target device selected as an operation target and an operation user can be visually recognized.

19 Claims, 29 Drawing Sheets

(51) Int. Cl.
*G06F 3/16* (2006.01)
*H04N 9/31* (2006.01)

(56) References Cited

U.S. PATENT DOCUMENTS

| 2014/0055349 A1* | 2/2014 | Itoh | G06F 3/005 |
| | | | 345/156 |
| 2014/0359651 A1* | 12/2014 | Lee | G06F 3/017 |
| | | | 725/25 |
| 2016/0027146 A1* | 1/2016 | Kim | G06F 3/14 |
| | | | 345/629 |
| 2016/0140690 A1* | 5/2016 | Natori | G06F 3/1431 |
| | | | 345/667 |

FOREIGN PATENT DOCUMENTS

| JP | 2013-205983 A | 10/2013 |
| JP | 2017-504849 A | 2/2017 |
| WO | WO 2016/157662 A1 | 10/2016 |

* cited by examiner

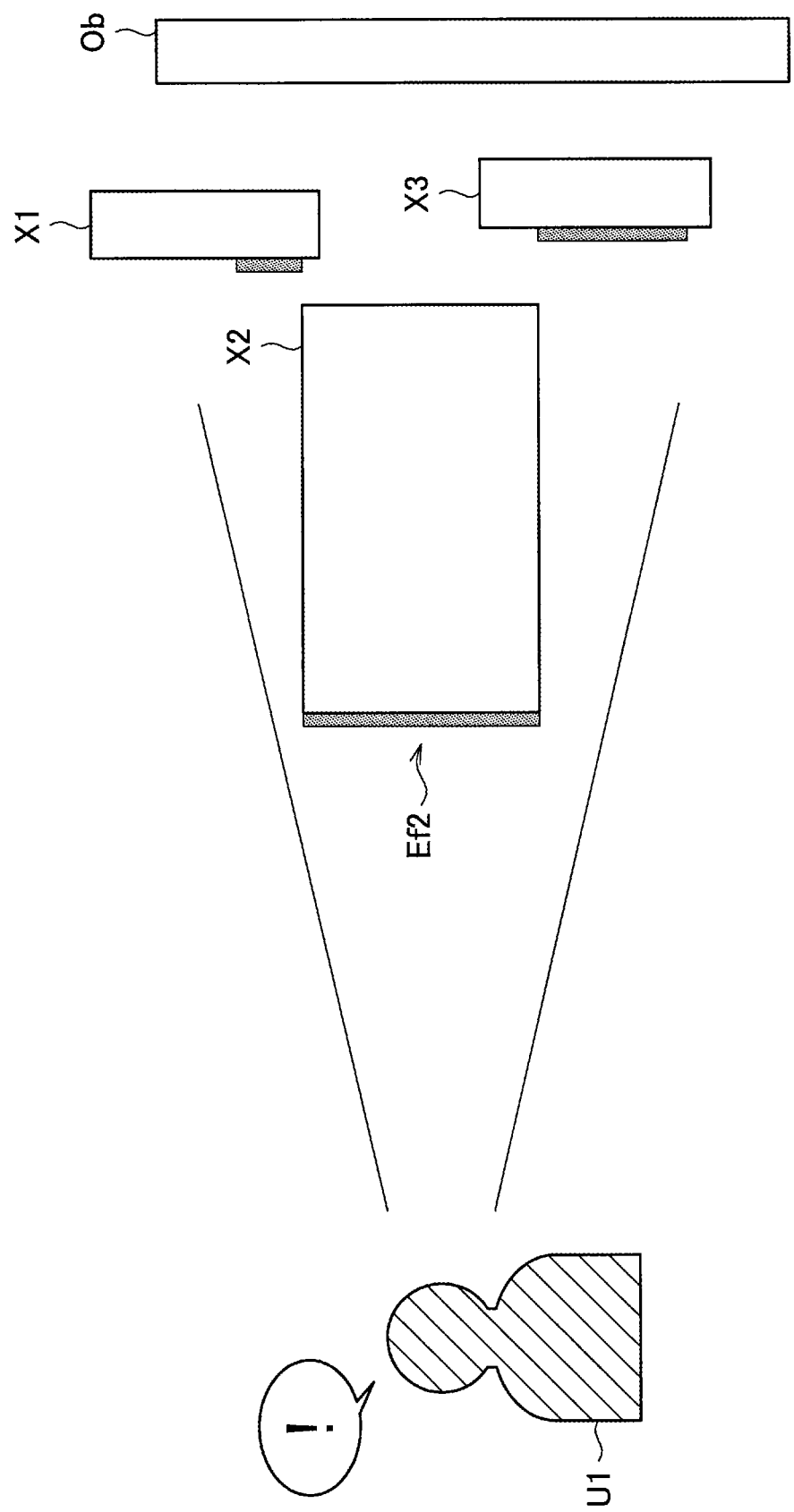

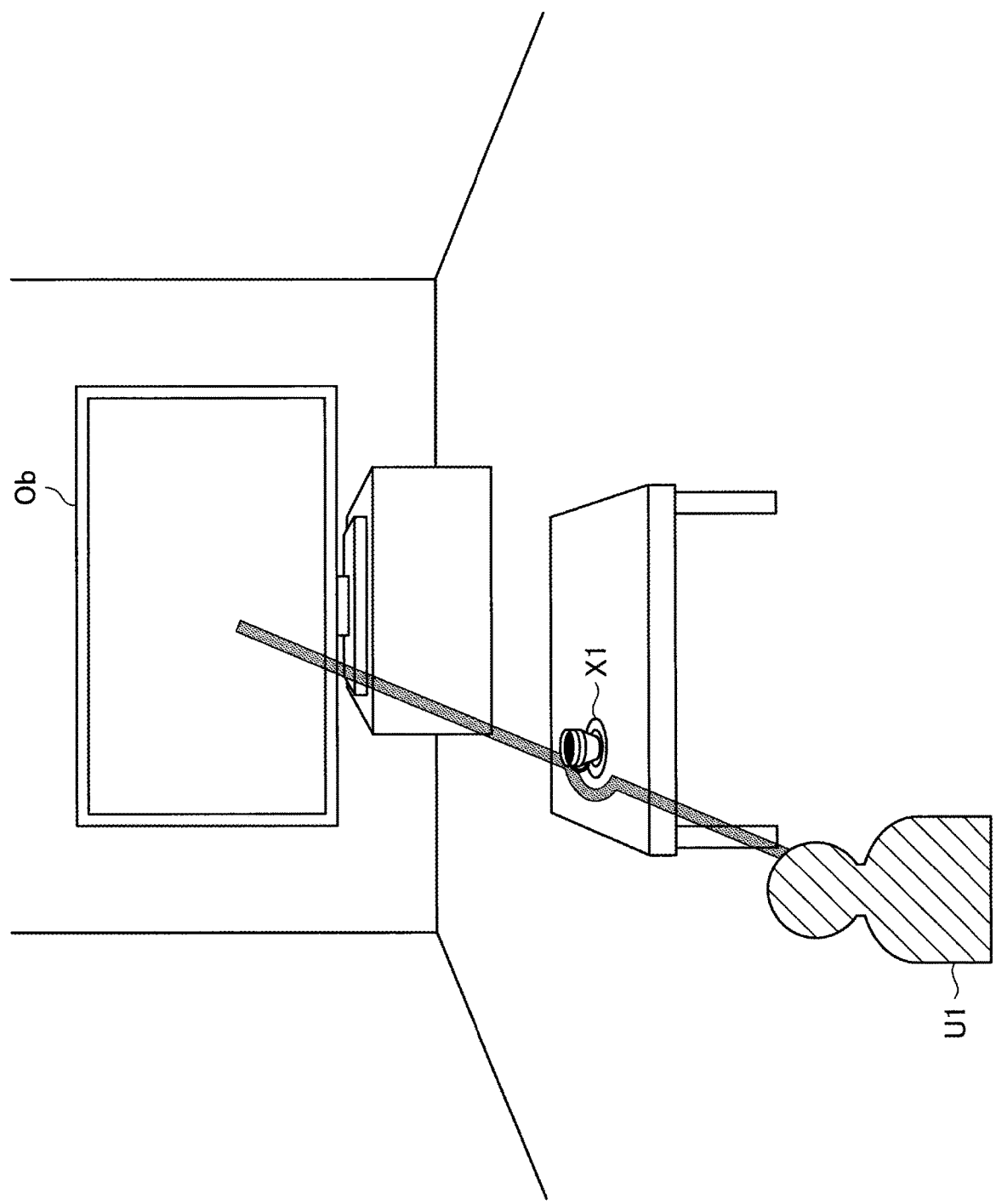

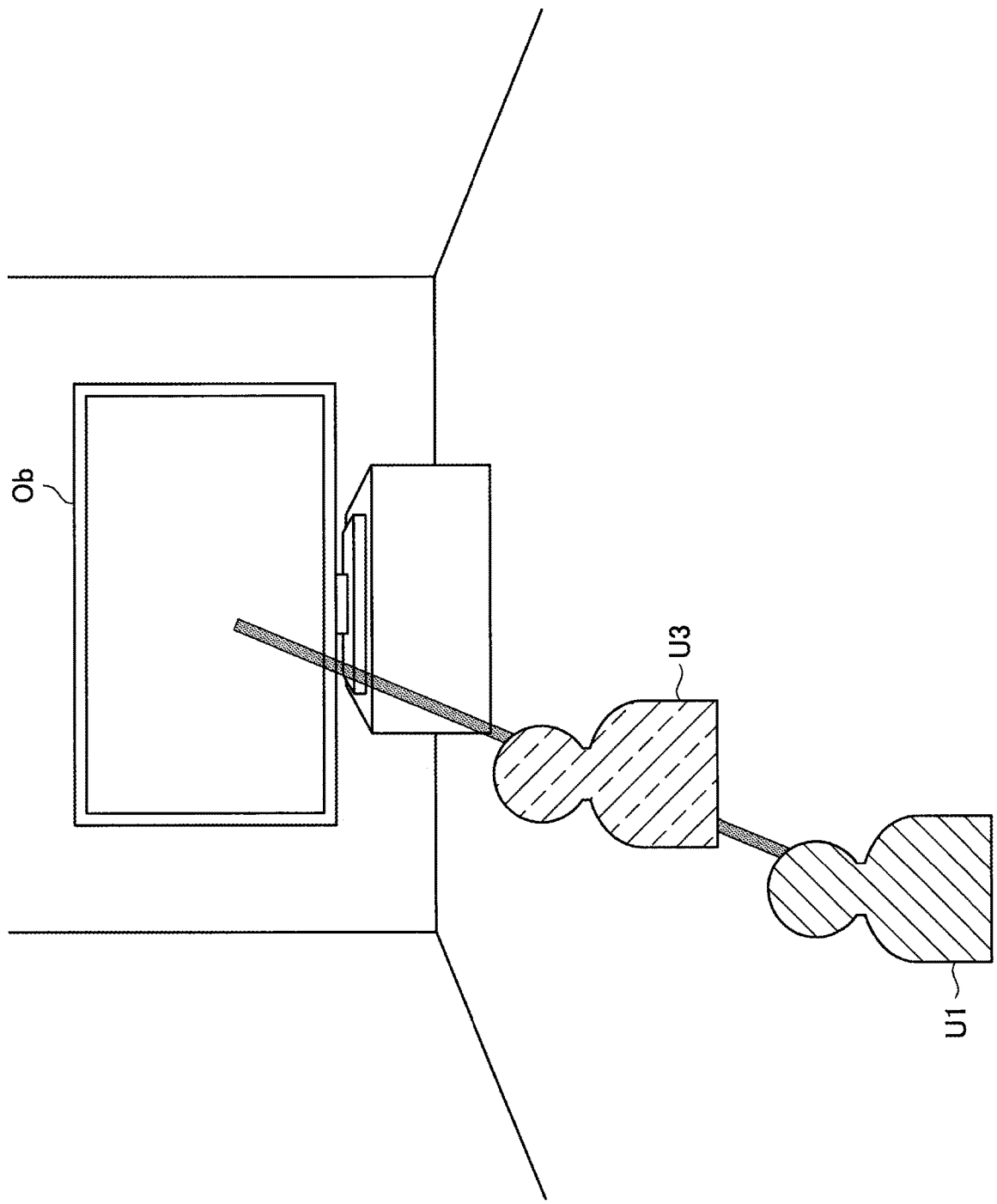

FIG.16
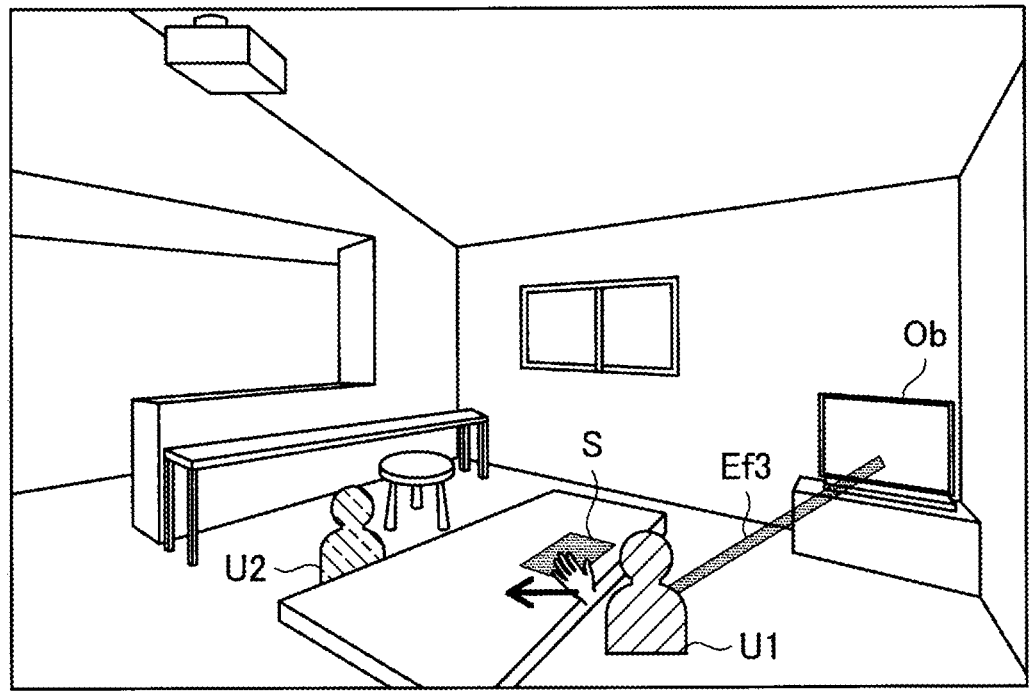
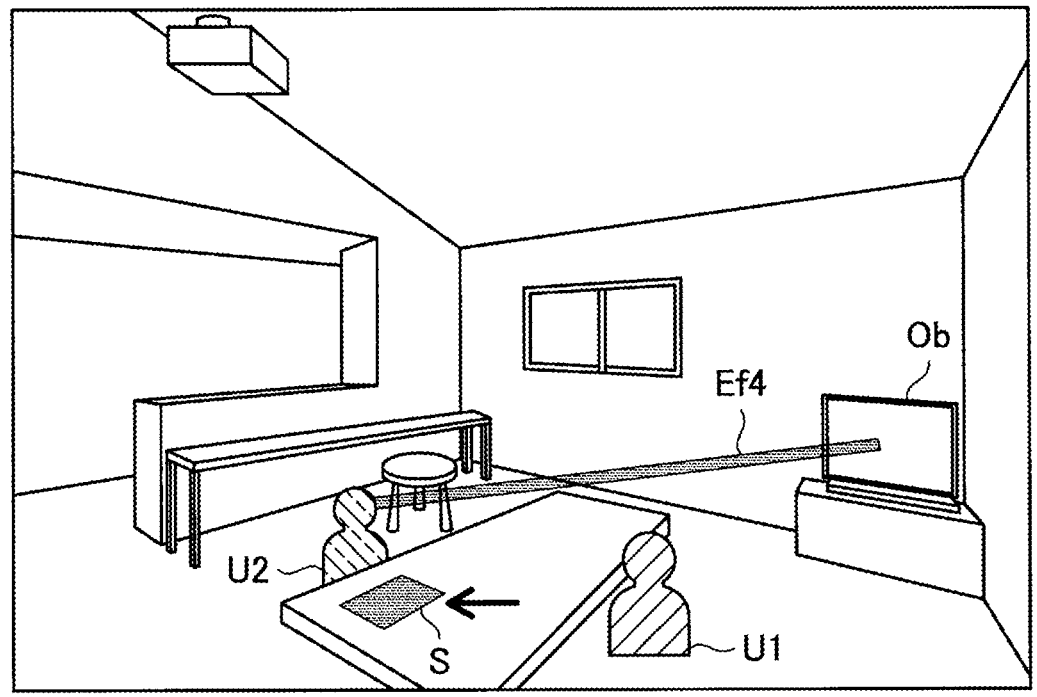

INFORMATION PROCESSING DEVICE, INFORMATION PROCESSING METHOD, AND RECORDING MEDIUM

CROSS REFERENCE TO PRIOR APPLICATION

This application is a National Stage Patent Application of PCT International Patent Application No. PCT/JP2018/037291 (filed on Oct. 5, 2018) under 35 U.S.C. § 371, which claims priority to Japanese Patent Application No. 2017-240512 (filed on Dec. 15, 2017), which are all hereby incorporated by reference in their entirety.

FIELD

The present disclosure relates to an information processing device, an information processing method, and a recording medium.

BACKGROUND

Various electric appliances such as home electric appliances and information devices are present in spaces where people live. In recent years, techniques which allow users to remotely operate such electric appliances without using devices such as a laser pointer and a remote controller have been developed.

For example, Patent Literature 1 discloses a technique for inputting a control command to an operation target device based on intuitive operation of a user such as a gesture by a hand of the user.

CITATION LIST

Patent Literature

Patent Literature 1: JP 2013-205983 A

SUMMARY

Technical Problem

However, in the technique described in Cited Literature 1 or the like, when a plurality of operation target devices are present in a predetermined real space, it is sometimes not seen whether a target device, which is an operation target, has been successfully selected. When a plurality of operation users are present in the predetermined real space, it is sometimes not seen who among the plurality of operation users has an operation authority. That is, in the technique described in Cited Literature 1 or the like, operation cannot be recognized before the operation is actually reflected on the operation target device.

In view of the circumstances, it is desirable to improve convenience by performing display in which the target device selected as the operation target and the operation user can be visually recognized.

Solution to Problem

According to the present disclosure, an information processing device is provided that includes a display control unit that controls, based on position information of a target device in a predetermined real space and position information of a user having an operation authority for the target device, display corresponding to a positional relation between the user and the target device such that the user can visually recognize the display in the real space.

Moreover, according to the present disclosure, an information processing method is provided that includes controlling, based on position information of a target device in a predetermined real space and position information of a user having an operation authority for the target device, display corresponding to a positional relation between the user and the target device such that the user can visually recognize the display in the real space.

Moreover, according to the present disclosure, a recording medium is provided that records a program for causing a computer to function as a display control unit that controls, based on position information of a target device in a predetermined real space and position information of a user having an operation authority for the target device, display corresponding to a positional relation between the user and the target device such that the user can visually recognize the display in the real space.

According to the present disclosure, it is possible to control, based on position information of a target device and position information of a user having an operation authority for the target device, display corresponding to a positional relation between the user and the target device such that the user can visually recognize the display in a real space. Consequently, since the user can recognize that the target device has been selected as an operation target and that the user has the operation authority, it is possible to improve convenience of the user.

Advantageous Effects of Invention

As explained above, according to the present disclosure, it is possible to improve convenience by performing display in which the target device selected as the operation target and the operation user can be visually recognized.

Note that the effect described above is not always limiting and any effects described in this specification or other effects that can be grasped from this specification may be achieved together with the effect described above or instead of the effect described above.

BRIEF DESCRIPTION OF DRAWINGS

FIG. 13 is a diagram illustrating an example of display projected by the system according to the embodiment.

FIG. 14A a diagram illustrating an example of display projected by the system according to the embodiment.

FIG. 14B is a diagram illustrating an example of display projected by the system according to the embodiment.

FIG. 16 is a diagram illustrating an example of display projected by a system according to a modification.

DESCRIPTION OF EMBODIMENTS

Figure 1:
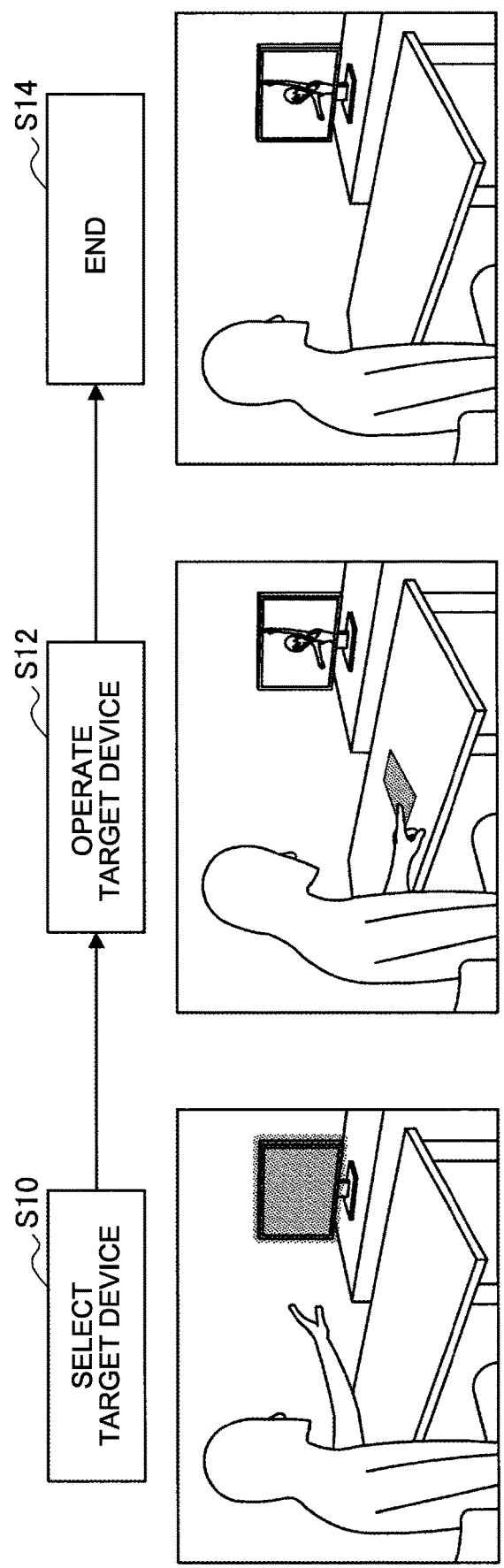
FIG. 1 is a schematic diagram illustrating an operation flow according to an embodiment of the present disclosure.

A preferred embodiment of the present disclosure is explained in detail below with reference to the accompanying drawings. Note that, in this specification and the drawings, redundant explanation about components having substantially the same functional configurations is omitted by affixing the same reference numerals and signs to the components.

Note that the explanation is made in the following order.
1. Overview of a system
2. Configuration example
3. Flow of processing
4. Determination of a display place
4.1. Projection onto the vicinity of a target device
4.2. Projection onto a place separated from the target device
4.3. Case in which display is performed by a smartphone or an HMD
5. Modification
5.1. Case in which an operation authority is transferred
5.2. Case in which operation to a target device is unrecognizable
5.3. Case in which a target device is locked against a certain user
6. Hardware configuration example
7. Summary Embodiment 1. Overview of a System First, a system overview of an information processing device according to an embodiment of the present disclosure is explained with reference to FIG. 1. FIG. 1 illustrates a flow in the case in which operation of a target device is performed by remote operation in a predetermined real space (hereinafter referred to as real space as well). The predetermined real space indicates a space in which a user and an operation target device are present, for example, an interior partitioned from an outside environment and indicates a space including fixed numbers of users and target devices such as a room or a meeting room.

In the flow illustrated in FIG. 1, first, the user selects a target device set as an operation target (S10). By selecting the target device, the user can have an operation authority for the target device set as the operation target. The operation authority means a right for operating the target device before the target device is operated. By having the operation authority, the user can actually operate the target device later. Subsequently, the user having the operation authority performs, for example, input of a command to thereby operate the selected target device (S12). When command content is reflected on the target device, the user grasps that operation ends (S14).

In the flow explained above, when a plurality of devices are present in a predetermined space and an operation target device is selected out of the plurality of devices by remote operation such as a gesture, if the selected device is not clearly indicated to the user, the user cannot determine, before the operation is completed, whether a device that the user desires to operate is correctly selected.

When a plurality of users are present in the predetermined space, it is sometimes not seen which user selects which device as an operation target device. In this case, when commands input by the plurality of users conflict, it is likely that operation against intentions of the users is input to the target device. It is likely that convenience of the users is deteriorated because, for example, cancel operation increases.

Therefore, in the technique of the present disclosure, by displaying for a user display mutually associating users and target devices, it is possible to clearly indicate a selected target device and a user having an operation authority for the target device, and quick grasping of selection operation and suppression of conflict of input commands among the users can be achieved.

Figure 2:
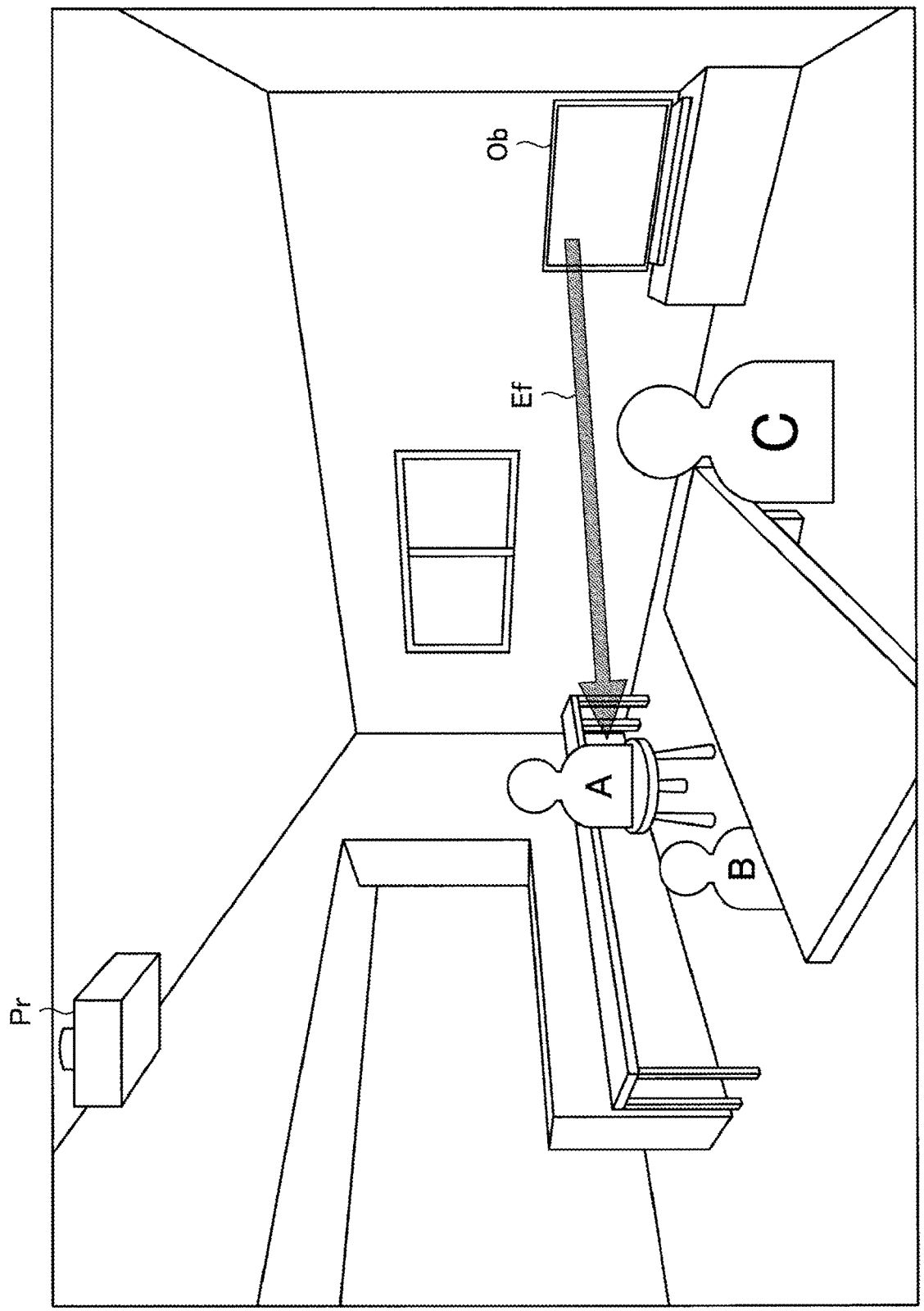
FIG. 2 is a conceptual diagram according to the embodiment.

FIG. 2 is a conceptual diagram of the embodiment of the present disclosure. As illustrated in FIG. 2, one or more users, for example, users A, B, and C are present in the predetermined space. Further, a projecting device Pr that projects display is set in this space. When the user A operates an operation target device Ob, the projecting device Pr performs, for example, display Ef for indicating, with an arrow line, the target device Ob selected by the user A and the user A. Consequently, the user A can visually recognize that the user A is selecting the target device Ob and the user A has an operation authority. In FIG. 2, for example, the projecting device Pr is described as an example of a target on which the display Ef is performed. However, the display Ef may be displayed in a display unit of the target device Ob or may be displayed in a lamp or the like of a housing unit of the target device Ob. The display Ef may be displayed in a virtual space visually recognized via a device such as a smartphone or a head mounted display (HMD).

In this embodiment explained below, display projected mainly by the projecting device is explained. Further, as variations of this embodiment, a modification of display according to a projection place, display in the case in which a display device is a target device, display and the like according to, for example, presence or absence of an operation authority, and display and the like to the user are explained.

2. Configuration Example

Figure 3:
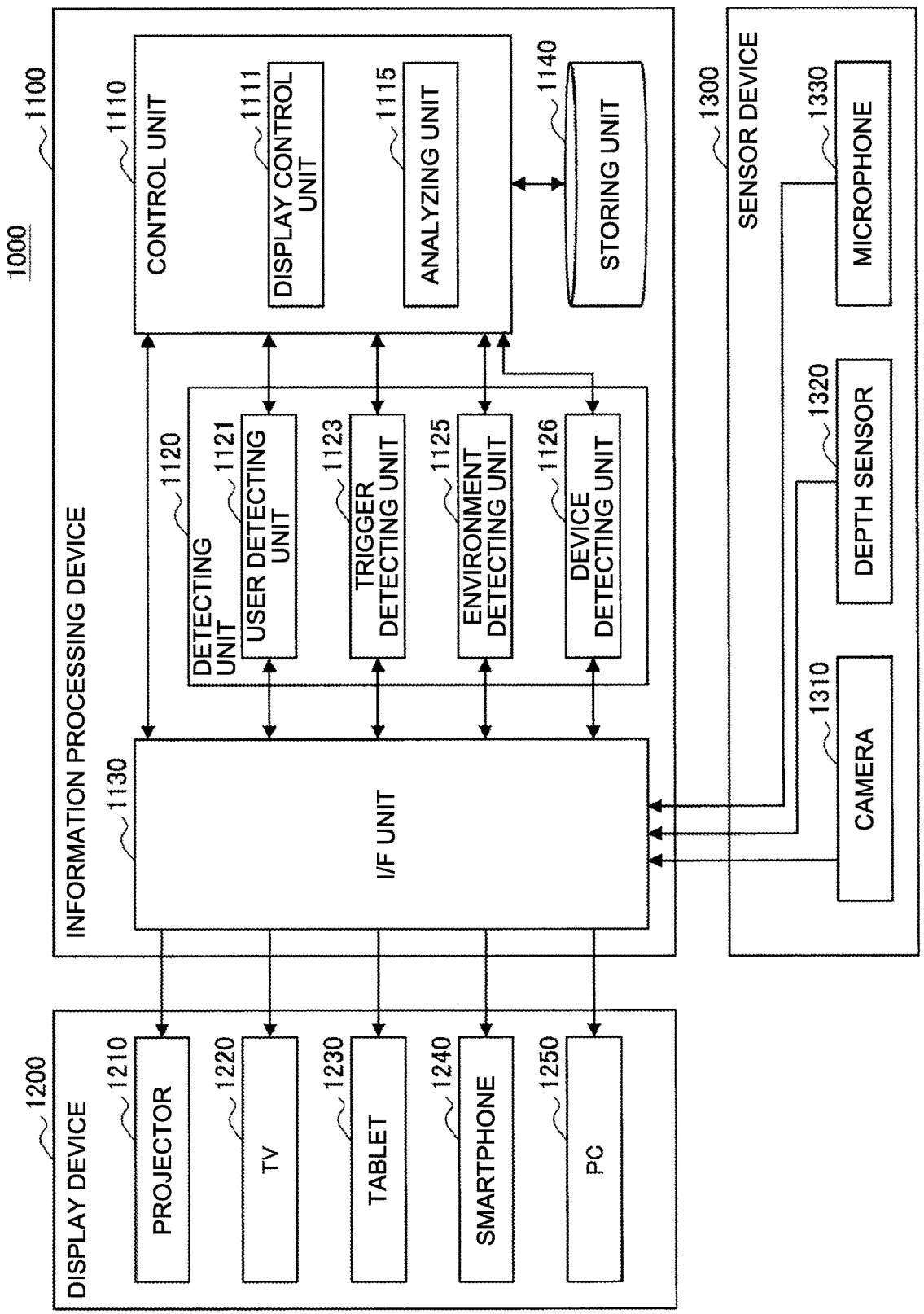
FIG. 3 is a block diagram illustrating an example of the configuration of a system according to the embodiment.

FIG. 3 is a block diagram illustrating an example of the configuration of a system 1000 according to this embodiment. As illustrated in FIG. 3, the system 1000 includes an information processing device 1100, a display device 1200, and a sensor device 1300. In this embodiment, in the system 1000, the information processing device 1100, the display device 1200, and the sensor device 1300 are illustrated as separate components. However, the display device 1200 may be included in the information processing device 1100. The sensor device 1300 may also be included in the information processing device 1100.

(1) Display Device 1200

The display device 1200 has a function of presenting display corresponding to a positional relation between the user and the target device such that the user is capable of visually recognizing the display in a real space. The display device 1200 includes at least one or more of a projector 1210, a TV 1220, a tablet 1230, a smartphone 1240, or a personal computer (PC) 1250. In this embodiment, as illustration, visually recognizable display is used in order to indicate a target device selected by a user and indicate that the user has an operation authority for the target device. However, this embodiment is not limited to such illustration.

For example, it goes without saying that the target device selected by the user and the fact that the user has the operation authority for the target device may be presented to the user using voice or the like. In that case, the display device 1200 includes a speaker or a unidirectional speaker and has a function of a sound output device. Consequently, the display device 1200 presents sound corresponding to the positional relation between the user and the target device to the user.

The projector 1210 is a projecting device that projects display onto any place in the predetermined space. The projector 1210 may be, for example, a stationary wide-angle projector or may be a so-called moving projector including a movable unit capable of changing a projecting direction such as a Pan/Tilt driving type. The TV 1220 is a device that receives a radio wave of a television broadcast and outputs an image and sound. The tablet 1230 is a wirelessly communicable mobile device that includes a screen typically larger than a screen of the smartphone 1240 and outputs an image, sound, vibration, and the like. The smartphone 1240 is a wirelessly communicable mobile device that includes a screen typically smaller than a screen of the tablet 1230 and outputs an image, sound, vibration, and the like. The PC 1250 is a stationary desktop PC or a mobile notebook PC capable of outputting an image, sound, and the like.

The display device 1200 explained above has a function of image display. Therefore, the display device 1200 can present the display corresponding to the positional relation between the user and the target device in the technique of the present disclosure such that the user is capable of visually recognizing the display in the real space.

The technique of the present disclosure may perform presentation corresponding to the positional relation between the user and the target device with sound rather than display as explained above. In that case, the display device functions as a sound output device and includes a speaker or a unidirectional speaker. The speaker converts sound data into an analog signal via a digital analog converter (DAC) and an amplifier and outputs (reproduces) sound to the user. The unidirectional speaker is a speaker capable of forming directivity in a single direction and can output sound to the user.

The display device 1200 outputs display based on control by the information processing device 1100. The information processing device 1100 is also capable of controlling a form of display in addition to information or content to be displayed. For example, the information processing device 1100 can control a projecting direction of the projector 1210 that projects display.

Note that the display device 1200 may include a components capable of performing any display output other than the components explained above. For example, the display device 1200 may include a head mounted display (HMD), an augmented reality (AR) glass, or the like.

(2) Sensor Device 1300

The sensor device 1300 includes at least one or more of cameras 1310, depth sensors 1320, or microphones 1330.

The camera 1310 is an imaging device that captures an image (a still image or a moving image) such as an REB camera or a thermo camera and includes a lens system, a driving system, and an imaging element. The depth sensor 1320 is an infrared distance measuring device, an ultrasonic measuring device, a laser imaging detection and ranging (LiDAR), a stereo camera, or the like and is a device that acquires depth information. The microphone 1330 is a device that collects ambient sound and outputs sound data obtained by converting the sound into a digital signal via an amplifier and an analog digital converter (ADC).

The sensor device 1300 may sense information based on the control by the information processing device 1100. For example, the information processing device 1100 can control a zoom ratio and an imaging direction of the camera 1310.

Note that the sensor device 1300 may include a component capable of performing any sensing other than the components explained above. For example, the sensor device 1300 may include devices to which information can be input by the user such as a mouse, a keyboard, a touch panel, a button, a microphone, a switch, and a lever. The sensor device 1300 can include various sensors such as a time of flight (ToF) sensor, an ultrasonic sensor, an air pressure sensor, and a gas sensor ($CO_2$).

(3) Information Processing Device 1100

The information processing device 1100 includes an interface (I/F) unit 1130, a detecting unit 1120, a control unit 1110, and a storing unit 1140.

I/F Unit 1130

The I/F unit 1130 is a connecting device for connecting the information processing device 1100 and other devices. The I/F unit 1130 is realized by, for example, a universal serial bus (USB) connector and the like, and performs input and output of information between the I/F unit 1130 and the components of the display device 1200 and the sensor device 1300.

Detecting Unit 1120

The detecting unit 1120 includes a user detecting unit 1121, a trigger detecting unit 1123, an environment detecting unit 1125, and a device detecting unit 1126. The detecting unit 1120 has a function of extracting, with the components, detection data set as a target from sensor information acquired from the sensor device 1300 and outputting detection data used in the control unit 1110 to the control unit 1110.

(User Detecting Unit 1121)

The user detecting unit 1121 has a function of detecting user information based on information sensed by the sensor device 1300. The user information is information concerning the user.

The user information can include information indicating the position of the user in the predetermined space sensed by the sensor device 1300. The position of the user can be detected by a time of flight (ToF) sensor, a thermo camera, an RGB camera, an ultrasonic sensor, an air pressure sensor, a gas ($CO_2$) sensor, or the like. When a plurality of users are present in the predetermined space, these sensors are capable of detecting the number of users as well.

The user information can include information indicating a visual line of the user. The information indicating the visual line of the user includes information indicating the position of a visual point of the user and a visual line direction. The information indicating the visual line of the user may include information indicating a direction of the face and the head of the user and may further include information indicating a direction of an eyeball. For example, the information indicating the visual line of the user can be detected by analyzing an image of an eye of the user obtained by an RGB camera, an infrared camera, an eyepiece camera worn by the user, or the like.

(Trigger Detecting Unit 1123)

The trigger detecting unit 1123 has a function of detecting trigger information based on information sensed by the sensor device 1300.

The trigger information can include information indicating a gesture of the user. The information indicating a gesture of the user can be detected by analyzing an image obtained by an RGB camera, an infrared camera, or the like.

The information indicating a gesture of the user can include gestures performed by the user such as an air pointing gesture and a touch gesture. For example, a gesture of pointing the target device Ob with a finger, and the like is included.

The trigger information may include information by voice uttered by the user, rather than the information indicating a gesture explained above. The information of voice uttered by the user can be detected by analyzing voice collected by a microphone or the like. For example, when the target device Ob is designated by a voice instruction such as "television", the trigger detecting unit 1123 may determine that a trigger is detected. Consequently, even if the user cannot perform a motion such as a gesture, the trigger detecting unit 1123 can detect a trigger with voice.

(Environment Detecting Unit 1125)

The environment detecting unit 1125 has a function of detecting environment information based on information sensed by the sensor device 1300. The environment information is information concerning the predetermined space where the user is present. The environment information can include various kinds of information.

The environment information can include information indicating a shape of the predetermined space where the user is present. The information indicating a shape of a space includes information indicating shapes forming a space such as a wall surface, a ceiling, a floor, a door, furniture, an ornament, and living goods. The information indicating a shape of a space may be two-dimensional information or may be three-dimensional information such as point cloud.

The environment information can include information indicating a surface state of an object forming a space. The surface state includes, for example, unevenness and a color of a surface. The unevenness of the surface can be detected based on depth information obtained by, for example, a LiDAR or a depth sensor. The color of the surface can be detected by analyzing an image captured by, for example, an RGB camera.

The environment information can include information indicating illuminance on the surface of an object forming a space. The illuminance on the surface of the object can be detected by an illuminance sensor or an RGB camera. The illuminance on the surface of the object can be used to create an environment light map obtained by mapping the illuminance on the surface of the object in the predetermined space. The environment light map indicates a distribution of illuminance in the predetermined space and is used to appropriately selecting a display method easily visually recognized by the user.

The environment information can include information indicating the position of an object in a space. For example, positions of a glass, a chair, a table, a magazine, a remote controller, an electronic device, and the like in a room can be detected by image recognition. The information indicating the position of the object in the space can also naturally include position information of an object highly likely to be fried in the predetermined space such as a wall surface, a ceiling, a floor, a door, furniture, and an ornament.

The environment information may be hierarchized stepwise according to a frequency of movement of the object in the information indicating the position of the object. For example, a glass or the like that the user frequently carries and moves its position is classified as a frequently moving object and a wall, a ceiling, or the like, which does not move, is classified as an immobile object using a machine learning algorithm in which deep learning is used. Since a lot of detection information is obtained in the sensor device 1300, when display is controlled considering all the obtained detection information, a load on the information processing device 1100 is highly likely to be large. Accordingly, by controlling the display considering only a difference of the object classified into the frequently moving object, the information processing device 1100 is capable of performing highly accurate and high speed display control while suppressing the load on the information processing device 1100.

The environment information can include information concerning environment sound in the predetermined space. By grasping the environment sound, it is possible to select which of display and sound corresponding to the positional relation between the user and the target device is presented to the user. When the sound corresponding to the positional relation between the user and the target device is presented to the user, it is possible to achieve improvement of recognizability by the user by changing volume of the sound according to the environment sound.

(Device Detecting Unit 1126)

The device detecting unit 1126 has a function of detecting the presence and the position of the target device set as the operation target of the user in the predetermined space. For example, in order to detect the presence of the target device, the presence of the target device may be detected by connection to the information processing device 1100 by digital living network alliance (DLNA, registered trademark), Wifi (registered trademark), USB connection, other dedicated machines, or the like. In this case, information such as a type and a manufacturer name of the target device may be detected.

When the presence and the position of the target device are detected, the presence and the position of the target device may be detected by an infrared camera or the like by pasting a recursive reflective material to the target device. The presence and the position of the target device may be detected by detecting, with a camera, a manufacturer name inscribed on the surface of the target device or a two-dimensional barcode printed on the surface of the target device.

When the presence and the position of the target device are detected, the presence and the position of the target device may be detected by generating unique ultrasound for each target device and collecting the ultrasound with a microphone and the like. The ultrasound may have, for example, a frequency in a range different from a human audible range.

The presence and the position of the target device may be detected by the device detecting unit 1126 as explained above or may be detected by registration operation by the user. These may be concurrently performed.

For example, the registration operation by the user is performed by finger pointing and utterance of voice by the user. Specifically, the type or the position of the target device can be registered by detecting, using a camera or the like, a presence position of the target device, which is a device present in a fingertip direction of the user, and collecting and analyzing voice of the user with a microphone or the like. The finger pointing by the user is explained as an example above. However, the presence position of the target device may be detected by a touch by the user, a visual line, or a marker and registration operation of the target device may be performed by UI selection or the like by the user.

Control Unit 1110

The control unit 1110 controls the entire operation in the information processing device 1100 according to various programs. The control unit 1110 includes a display control unit 1111 and an analyzing unit 1115. The display control unit 1111 controls display by the display device 1200. In this embodiment, an example is explained in which display is controlled for the user by the display control unit 1111. However, presentation to the user is not limited to the display and may be performed by sound. In that case, an acoustic control unit is included in the control unit 1110.

The analyzing unit 1115 has a function of performing an analysis of data necessary when the control unit 1110 controls the display. The analyzing unit 1115 has a function of determining, based on information obtained from the user detecting unit 1121, the environment detecting unit 1125, and the device detecting unit 1126, whether the user has performed a trigger operation and specifying an operation target device and specifying an operation user.

For example, the analyzing unit 1115 specifies the operation user and the operation target device according to position information indicating in which position the target device is disposed in the predetermined real space obtained from the device detecting unit 1126, ID information and the like indicating a name of the target device and position information indicating where in the predetermined real space the user is present obtained from the user detecting unit 1121, the trigger operation, or the like.

Specifically, since the user detecting unit 1121 detects a gesture, voice, or the like of the user according to the trigger operation of the user, the analyzing unit 1115 specifies the user who has performed the trigger operation as the operation user out of one or more users in the predetermined real space, collates the position information, the gesture, and the like of the user obtained by the user detecting unit 1121 and the position information of the target device obtained by the device detecting unit 1126, the name of the target device, and the like, analyzes which target device is set as the operation target by the operation user, and specifies the operation target device.

If the trigger operation is voice, for example, when the user utters predetermined trigger voice "television", the user detecting unit 1121 detects the user who has uttered the voice "television" and the analyzing unit 1115 specifies the user who has performed the trigger operation as the operation user out of the plurality of users. Further, the analyzing unit 1115 extracts a target device, which is a television, out of target devices detected by the device detecting unit 1126 and specifies the target device as the operation target device.

(Display Control Unit 1111)

The display control unit 1111 causes, based on the position information of the target device in the predetermined real space specified by the analyzing unit 1115 and the position information of the user having the operation authority for the target device, the display device 1200 to display the display corresponding to the positional relation between the user and the target device such that the user can visually recognize the display in a real space. Consequently, the user can grasp, before performing operation on the target device Ob selected by the user, the target device Ob by visually recognizing the display and can grasp which user has the operation authority.

The position information of the target device includes information indicating in which position the target device is disposed in the predetermined real space. The position information of the user having the operation authority for the target device includes information indicating in which position the user is present in the predetermined real space. The analyzing unit 1115 analyzes the positional relation between the user and the target device based on the position information of the user having the operation authority and the target device. The positional relation indicates a relation of mutual disposition positions between the user having the operation authority and the target device. The positional relation may include a mutual relation concerning a distance or a direction from the position of the target device or the user having the operation authority to a position where one of them is present. The display control unit 1111 may perform control of display from the positional relation obtained by the analyzing unit 1115.

For example, the display control unit 1111 may control to change the display according to whether the distance from the position of the target device to the position where the operation user is present is short or long. If the operation user is close to the target device, even if display is performed near the target device, the operation user not confused with another user. The operation user can recognize that the operation user has obtained an authority for operating the operation target device. On the other hand, if the operation user is far from the target device, it is highly likely that other users, other target devices, or the like are present between the target device and the operation user. Accordingly, the display control unit 1111 can suppress confusion of the other user and the operation user by controlling display having continuity to the position of the operation user, specifically, line segment or curved line display connecting the target device and the operation user, or the like rather than the display near the target device.

For example, the display control unit 1111 may control to change the display according to which direction is a direction from the position of the operation user to the position of the target device. For example, when sunlight comes in in the direction of the target device when viewed from the operation user, luminance is high in a real space in the direction, and visibility of display to the user is deteriorated, the display control unit 1111 may perform the control of the display using curved line display through a direction different from the direction of the target device when viewed from the operation user rather than using straight line display connecting the operation user and the target device.

The display control unit 1111 may control the display based on information obtained from the selected display device, the user detecting unit 1121, the environment detecting unit 1125, and the device detecting unit 1126 or may control the display mutually associated with the user and the target device based on the selection of the target device.

The selection of the target device means selecting a target device that the user desires to operate out of one or more target devices present in the predetermined real space. When the target device is selected by the user, the display control unit 1111 may control display mutually associated with the user having the operation authority and the target device. For example, when a first user selects one target device, the display control unit 1111 may control display mutually associated with the first user and the target device and may represent, with the display, that the first user has the operation authority for the target device.

When a second user different from the first user having the operation authority for the target device selects the target device in order to operate the target device, the display control unit 1111 may control display mutually associated with the first user having the operation authority and the target device and represent, with the display, that the first user has the operation authority for the target device. In the above explanation, one user has the operation authority. However, a plurality of users may have the operation authority or a plurality of second users may select the target device.

Like the trigger detection according to the trigger operation of the user having the operation authority, the selection of the target device may be performed according to at least one of a gesture and a voice input by the user detected by the user detecting unit 1121 and the trigger detecting unit 1123.

The display may be any display if the display is mutually associated with the user and the target device. The mutually associated display is display indicating that a relation is present between the user and the target device and includes display such as display of the direction of the user by the target device or projection of display indicating the direction of the user onto a place near the target device. Display content and the like of the display to the user can be selected according to conditions or case classification as appropriate. The conditions and the case classification are explained below.

The display control unit 1111 may select the components of the display device 1200 that are controlled by the display control unit 1111. In this embodiment, an example is mainly explained in which, for example, the projector 1210, which is a projecting device, or the TV 1220 including a display unit is selected as the display device. In the selection of the display device 1200, a suitable form is selected according to conditions or case classification. The conditions and the case classification are explained below.

3. Flow of Processing

Figure 4:
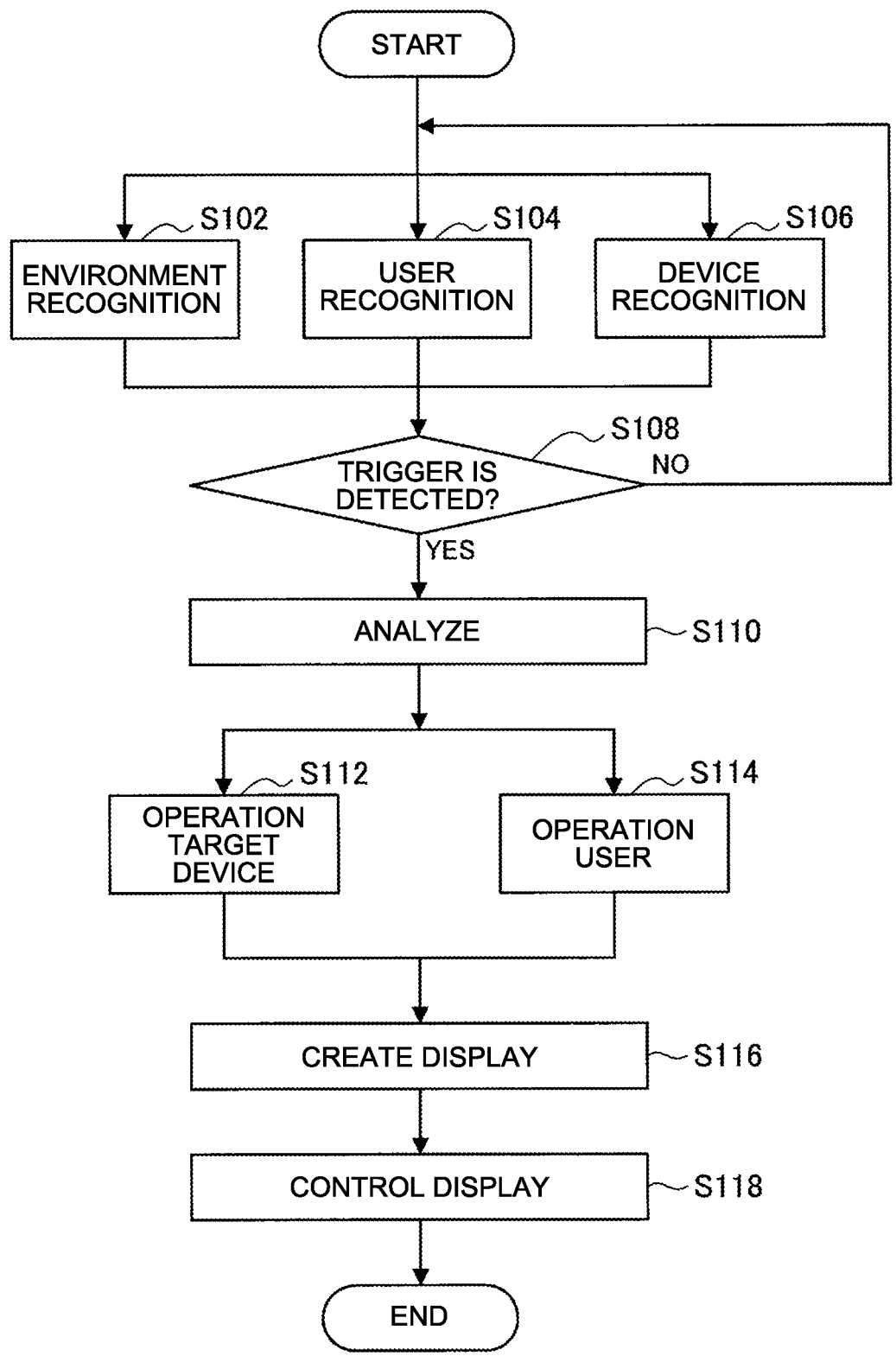
FIG. 4 is a sequence chart illustrating an example of a flow of display control executed in the system according to the embodiment.

A flow of processing in the technique according to the present disclosure, in which the components explained above are used, is explained with reference to FIG. 4. FIG. 4 illustrates the flow of the processing in the technique according to the present disclosure.

As illustrated in FIG. 4, for example, when a power button or the like is pressed, the system 1000 starts operations for environment recognition, user recognition, and device recognition. Specifically, the environment detecting unit 1125 performs the environment recognition, the user detecting unit 1121 performs the user recognition, and the device detecting unit 1126 performs the device recognition. These units may start the operations all at once or each unit may separately start the operations. The order of the start of the operations may be any order.

In the environment recognition, the environment detecting unit 1125 detects environment information (S102). For example, the environment detecting unit 1125 detects a position and a shape of a wall, opening and closing of a door, a position and a shape of a mug, and the like.

The system 1000 performs the user recognition in parallel to the environment recognition. In the user recognition, the user detecting unit 1121 detects user information (S104). For example, the user detecting unit 1121 detects information concerning the user by detecting a position of a user or the number of users and detecting a direction that the user faces.

The system 1000 performs the device recognition in parallel to the environment recognition and the user recognition. In the device recognition, the device detecting unit 1126 detects positions, shapes, names, and the like of electronic devices and the like that can be targets of operation by the user (S106).

Subsequently, the trigger detecting unit 1123 performs detection for a trigger such as a motion, a gesture, and the like of the user (S108). A target of the trigger detection may be voice or the like uttered by the user other than the motion and the gesture of the user.

In the trigger detection, when the user performs a predetermined gesture or utters predetermined voice and the like, the trigger detecting unit 1123 detects a trigger signal. When the system 1000 fails to detect a gesture, voice, or the like, the system 1000 starts the environment recognition, the user recognition, and the device recognition again. The gesture or the voice may be respectively performed as independent triggers or may be performed as a trigger obtained by combining a plurality of gestures and a plurality of kinds of voice uttering.

When a predetermined gesture, predetermined voice, or the like is detected in the trigger detection, the analyzing unit 1115 analyzes an operation user and a target device set as an operation target (S110). When the target device set as the operation target by the operation user is analyzed by the analyzing unit 1115, a target device for which the user has an operation authority and a user having the operation authority for the target device are specified (S112 and S114).

Subsequently, the display control unit 1111 selects the display device 1200 based on position information of the specified operation target device and position information of the specified user. The display control unit 1111 creates, based on position information of the display device 1200 and environment information and the user information, display visually recognizable by the user having the operation authority (S116). At this time, the display control unit 1111 may control a form of the display to be created such that visibility for the user having the operation authority is higher than visibility for another user not having the operation authority. The visibility is an indicator indicating a degree of easiness of recognition when the user confirms display. As the visibility is higher, the user can more easily grasp the display and, as the visibility is lower, the user less easily grasps the display.

Subsequently, the display control unit 1111 controls the display device 1200 (S118). For example, when the projector 1210 is selected as the display device 1200, the display control unit 1111 causes the projector 1210 to perform projection of display. Consequently, the system 1000 is capable of controlling the display corresponding to the positional relation between the user and the target device such that the user can visually recognize the display in a real space. Therefore, convenience of the user for remote operation is improved. In the technique according to the present disclosure, various variations are present concerning the selection and the display by the display device 1200. These variations of the technique according to the present disclosure are explained in detail in the next section.

4. Determination of a Display Place

The embodiment is explained here illustrating a case in which display controlled by the information processing device 1100 is projected by the projector 1210. However, for a display place and display, the user only has to be able to visually recognize the user having the operation authority and the selected target device. Therefore, a device that presents the display is not limited to the projector 1210.

The display only has to be display mutually associated with the user having the operation authority and the target device. The display control unit 1111 controls the display based on position information of a user U1 having the operation authority and the target device Ob analyzed by the analyzing unit 1115. The mutually associated display is display indicating that relationship is present between the target device Ob and the user U1 having the operation authority and may be, for example, display indicating a direction from the position of the target device Ob to a position where the user U1 having the operation authority is present or may be display of a line segment connecting the target device Ob and the user U1.

<4.1. Projection onto the Vicinity of the Target Device>

First, in the following explanation, display indicates a direction from the position of the target device Ob to a position where the user U1 having the operation authority is present and control of the display is performed in the vicinity of the target device. When users U1 and U2 are present in the predetermined space, it is determined, according to an angle formed by a straight line connecting the user UA having the operation authority and the target device Ob and a straight line connecting the other user U2 not having the operation authority and the target device, whether the display is displayed in the vicinity of the target device. A case in which the display is controlled in the vicinity of the target device is explained with reference to FIG. 5. The vicinity of the target device indicates a circumference and a periphery of the target device. The display is performed in the circumference and the periphery of the target device to suppress confusion of other target devices and the operation target device.

Figure 5:
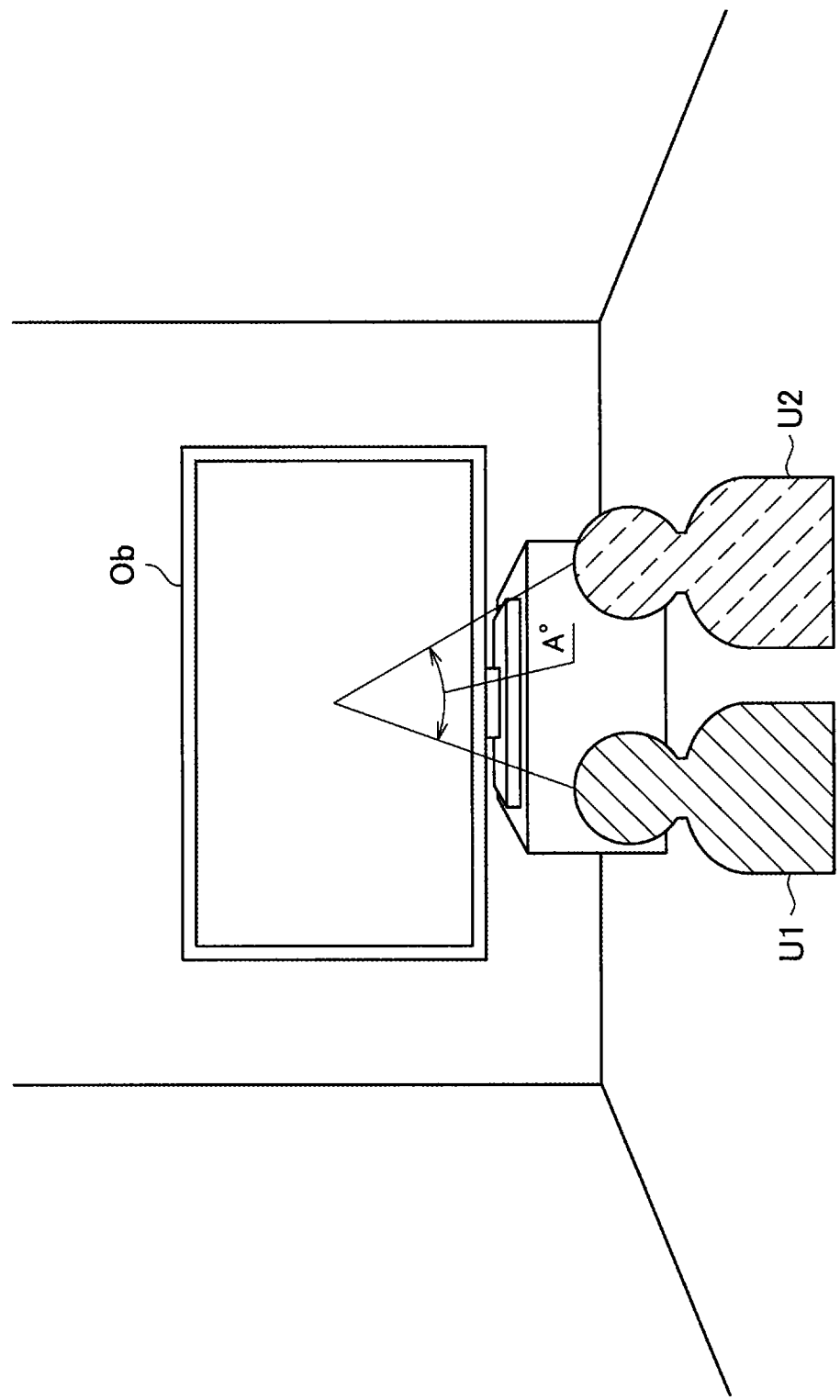
FIG. 5 is a conceptual diagram for explaining a concept of a place where projection is performed by the system according to the embodiment.

FIG. 5 is a diagram illustrating a disposition example of the users U1 and U2 and the target device Ob in the predetermined space. When the users U1 and U2 are present in the predetermined space, an angle formed by a straight line connecting the user U1 having the operation authority and the target device Ob and a straight line connecting the other user U2 not having the operation authority and the target device is represented as an angle A°. For example, when the user U1 and the user U2 come close to the target device Ob, the angle A° is considered to be large. In this case, the users U1 and U2 can recognize, with display of only a direction from the position of the target device Ob to the position of the user U1, which of the users U1 and U2 the display indicates. When the users U1 and U2 who can have the operation authority can be identified by only the display in the direction from the position of the target device Ob to the position of the operation user in this way, the system 1000 may control the display in the vicinity of the target device Ob. With such display, the user U1 and the user U2 can simultaneously recognize that the target device Ob is selected as an operation target and which of the user U1 and the user U2 the user having the operation authority is.

As a case in which the angle A° is large, besides a case in which the user U1 and the user U2 come close to the target device Ob, a case in which the user U1 and the user U2 are present while being sufficiently separated at the left end and the right end or the like of the target device Ob is conceivable. Even in this case, the display may be controlled in the vicinity of the target device Ob. Consequently, even if the user U1 and the user U2 are not present near the target device Ob, the system 1000 can simultaneously recognize that the target device Ob is selected as the operation target and which of the user U1 and the user U2 the user having the operation authority is.

Figure 6:
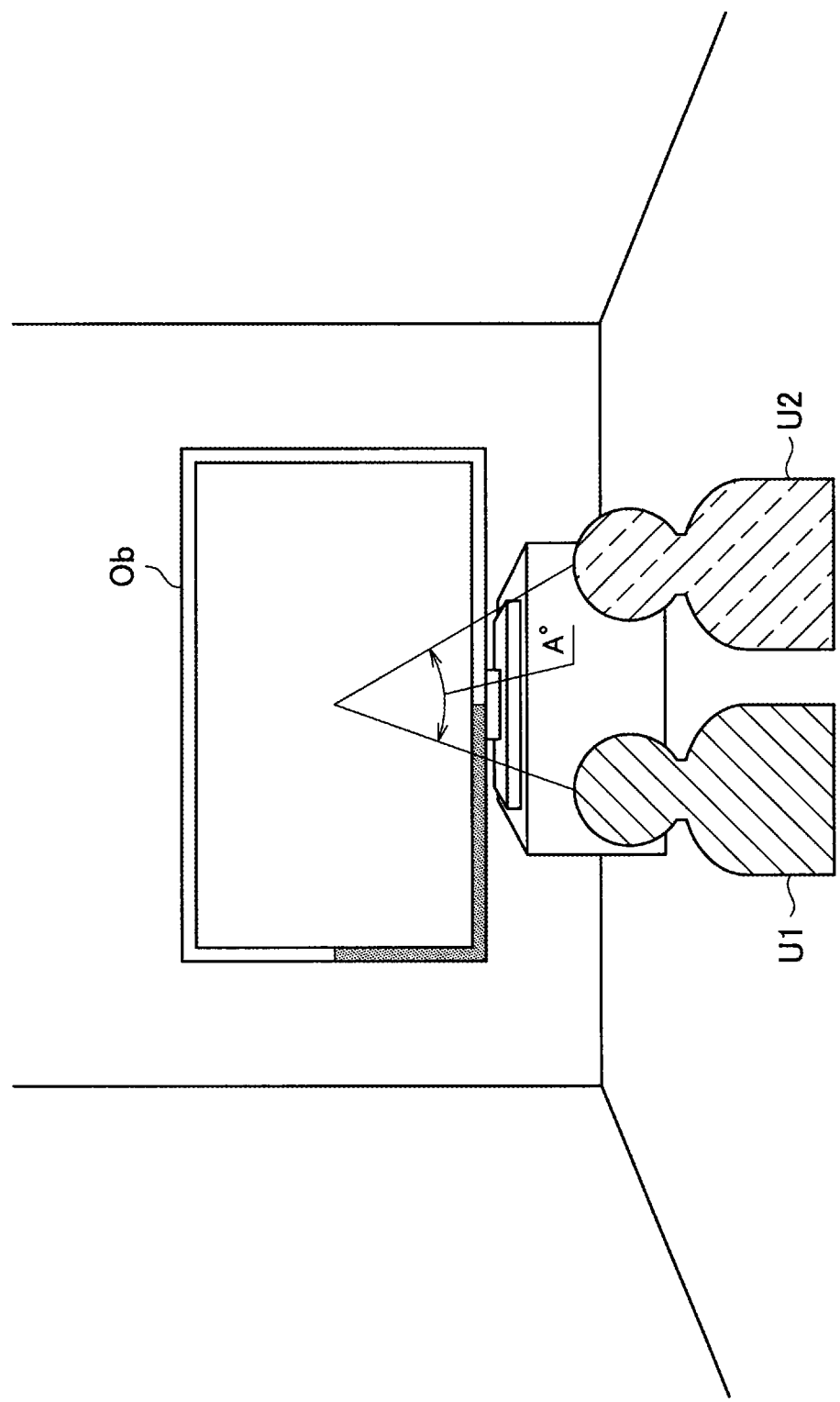
FIG. 6 is a diagram illustrating an example of display projected by the system according to the embodiment.

FIG. 6 is a diagram illustrating an example in which the display is performed in the vicinity of the target device Ob. FIG. 6 illustrates projection of display at an edge part of a frame unit of the target device Ob. In this way, when the users U1 and U2 can recognize in which directions the users U1 and U2 are respectively present with respect to the target device Ob, by performing projection of display at the edge part of the target device, the users can recognize which user has the operation authority for the target device Ob. With such a configuration, since display created by the system 1000 is displayed in the frame of the target device Ob, it is possible to simultaneously recognize, without affecting details of content displayed on the target device Ob, the target device and which of the user U1 and the user U2 is the user having the operation authority for the target device is.

Figure 7:
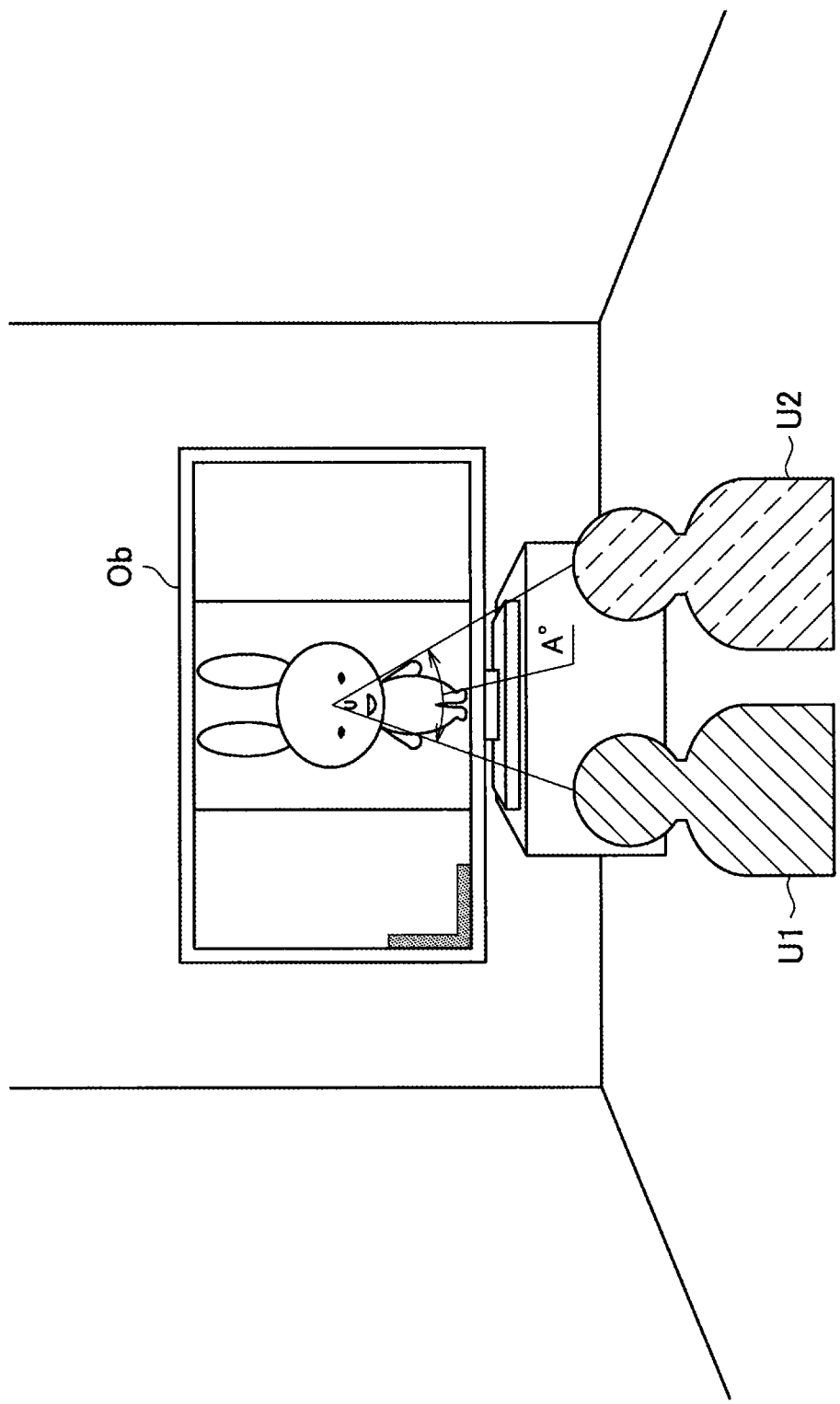
FIG. 7 is a diagram illustrating an example of display projected by the system according to the embodiment.

FIG. 7 is an example in which the display control unit 1111 controls display to be superimposed on a display region of the display unit of the target device Ob including the display unit. The display control unit 1111 may select, according to a ratio of a region where a display range of content displayed on the display unit of the target device Ob occupies the display region of the display unit, whether to project display to be superimposed on the display region of the display unit or project the display on the target device Ob outside the display region of the display unit. For example, when the display range of the content on the display unit is in a part of a range from the center of the display region of the display unit, the projected display may be projected to be superimposed in an area on the display region of the display unit. With such a configuration, the projection of the display can be completed in the region of the target device Ob. Therefore, when a plurality of target devices are present adjacent to one another, a target device indicated by the display can be suppressed from being misunderstood.

Figure 8:
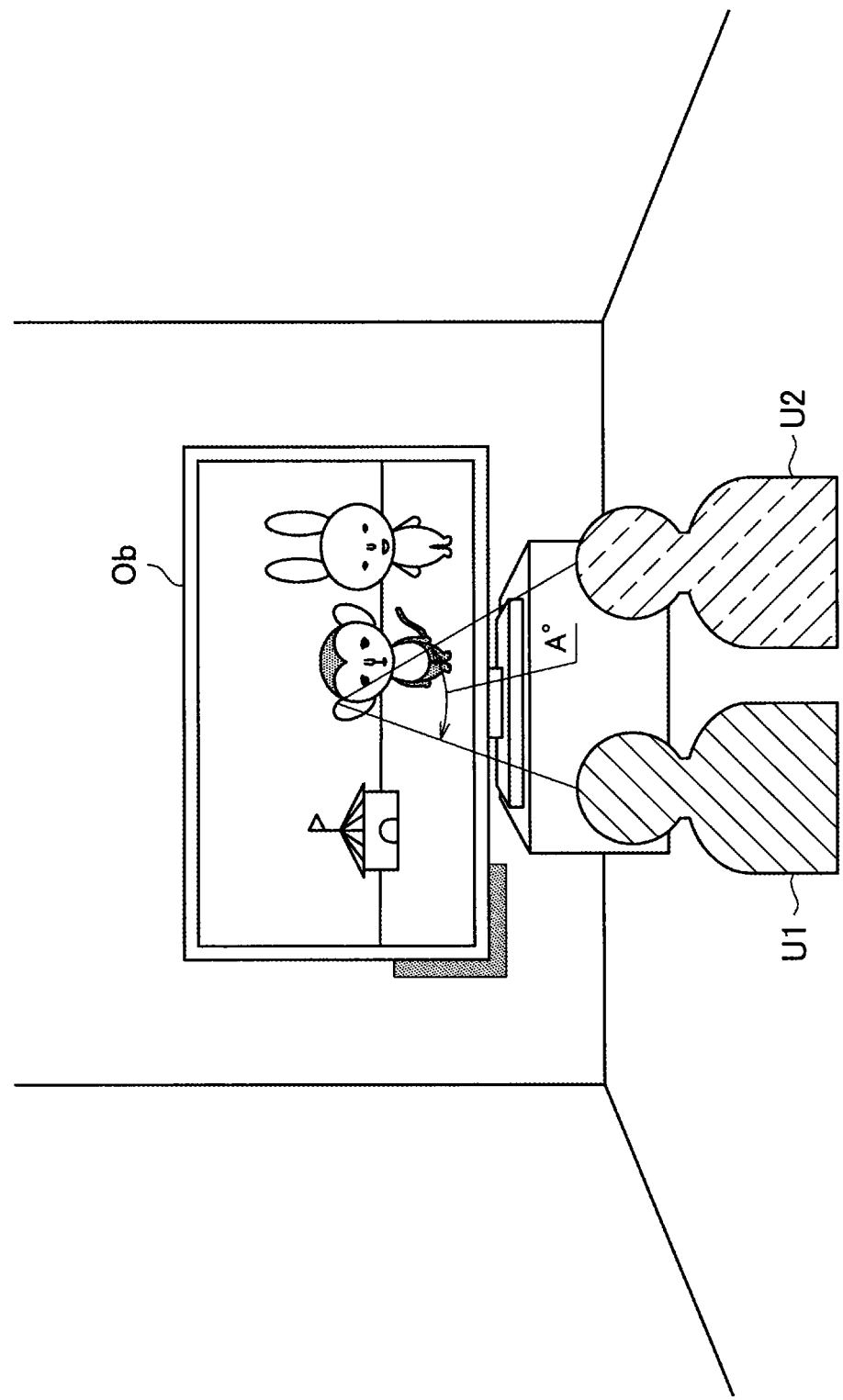
FIG. 8 is a diagram illustrating an example of display projected by the system according to the embodiment.

On the other hand, when the display range of the content on the display unit occupies most of the display region of the display unit, the projection of the display may be performed on the outer side of the display region of the display unit rather than on the display region of the display unit. FIG. 8 is an example in which the display control is performed on the outer side of the display region of the display unit rather than on the display region of the display unit. In FIG. 8, a state is illustrated in which the projection of the display is performed so as not to overlap the frame in the vicinity of the target device Ob. With such a configuration, the system 1000 can perform the projection of the display without affecting the content on the display unit.

In the above explanation, a projection place of the display to be projected by the projecting device in the target device Ob including the display unit is explained. However, when the target device Ob includes the display unit, the system 1000 may output the display to the display unit of the target device Ob rather than projecting the display with the projector 1210. As in the case explained above, a place where the display is presented may be controlled according to a ratio of the display region of the display unit occupied by the display range of the content displayed in the display region of the display unit of the target device Ob. The display by the target device Ob may be performed by the display unit or, when a lamp or the like is provided in the frame or the like of the target device Ob, may be performed with, for example, a flashing of a part such as the lamp. In this way, since the display is presented by the target device Ob itself, display mutually as: with the target device and the user having the operation authority can be presented to the user without separately preparing a projecting device such as the projector 1210.

An example in the case in which the display is controlled in the vicinity of the target device Ob is explained with reference to FIG. 9A to FIG. 9F. FIG. 9A to FIG. 9F are diagrams illustrating examples of display forms. In FIG. 9A to FIG. 9F, a state in which the user U1 has the operation authority is illustrated.

Figure 9A:
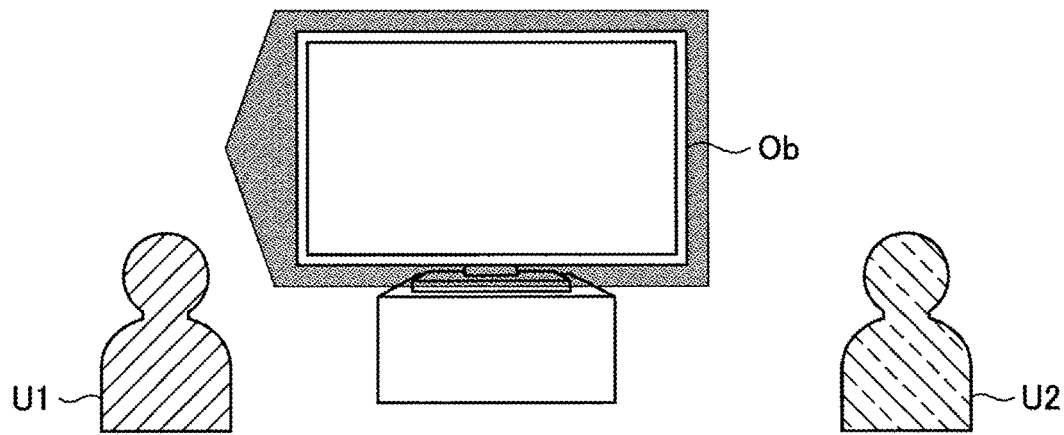
FIG. 9A is a diagram illustrating an example of display projected by the system according to the embodiment.

In FIG. 9A, display is projected over the entire periphery near the frame of the target device Ob and display representation having a convex shape in a direction in which the user U1 is present is performed. It is thus possible to simultaneously recognize the target device for which the user U1 has the operation authority and that the user U1 has the operation authority. The display representation of the convex shape in FIG. 9A is performed by an isosceles triangle having, as a bottom side, one side of the frame of the target device Ob present in the direction in which the user is present and having, starting from the frame, a convex part on the opposite side of a side where the display unit is present.

Figure 9B:
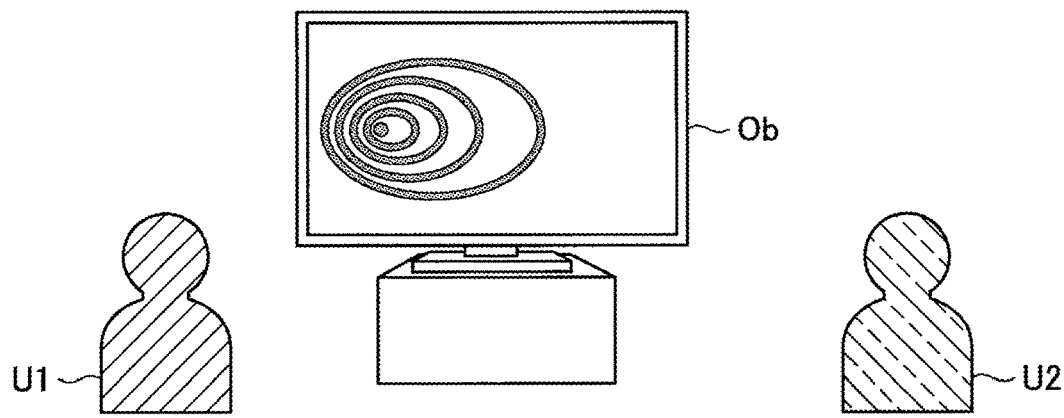
FIG. 9B is a diagram illustrating an example of display projected by the system according to the embodiment.

In FIG. 9B, representation having directivity is performed by projecting wave pattern display having distortion onto the display unit of the target device Ob. The wave pattern is displayed by wave pattern representation in which ellipses are contained in order from a large ellipse to a small ellipse and the centers of the ellipses move to the direction of the user U1 from the large ellipse to the small ellipse. In FIG. 9B, the direction in which the user U1 is present is indicated by a direction in which an interval between the ellipse is narrow to make it possible to simultaneously recognize the target device for which the user U1 has the operation authority and that the user U1 has the operation authority.

Figure 9C:
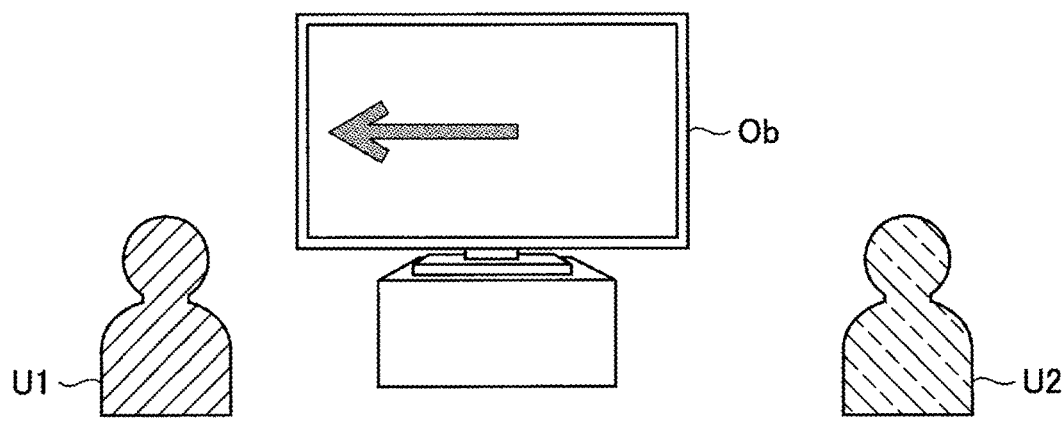
FIG. 9C is a diagram illustrating an example of display projected by the system according to the embodiment.

FIG. 9C illustrates a state in which display of an arrow mark is projected onto the display unit of the target device Ob. An arrow head direction of the arrow mark indicates the direction in which the user U1 is present to make it possible to simultaneously recognize the target device for which the user U1 has the operation authority and that the user U1 has the operation authority.

Figure 9D:
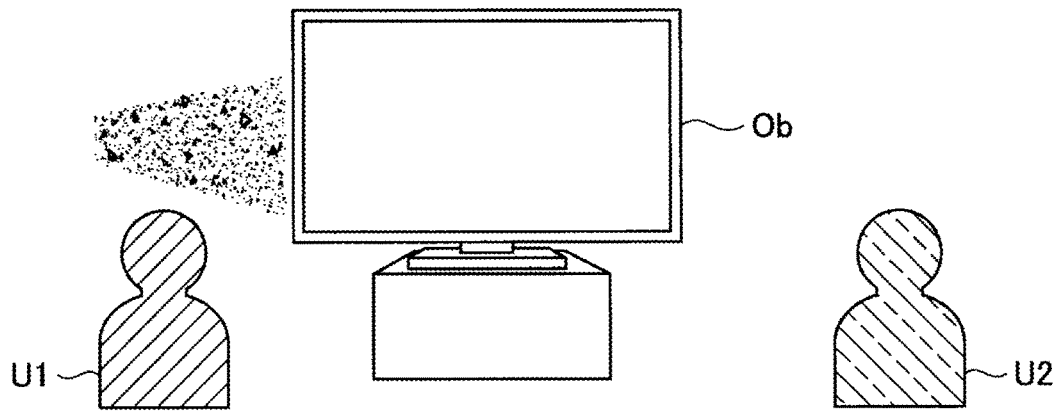
FIG. 9D is a diagram illustrating an example of display projected by the system according to the embodiment.

FIG. 9D is an example in which display indicating directivity is performed by particle representation in the vicinity of the target device Ob. The particle representation can be represented by a trapezoidal shape. The trapezoid in FIG. 9D is an isosceles trapezoid shape and is projected in the vicinity of the target device Ob on the side of one side of the frame of the target device Ob present in the direction in which the user is present. In the trapezoidal shape indicated by the particles, a lower base is disposed along one side on the side where the user U1 is present of the frame and an upper base is disposed, starting from the lower base, in a direction in which the user U1 is present. In this case, the length of the upper base is smaller than the length of the lower base. Such particle representation makes it possible to simultaneously recognize the target device for which the user U1 has the operation authority and that the user U1 has the operation authority.

Figure 9E:
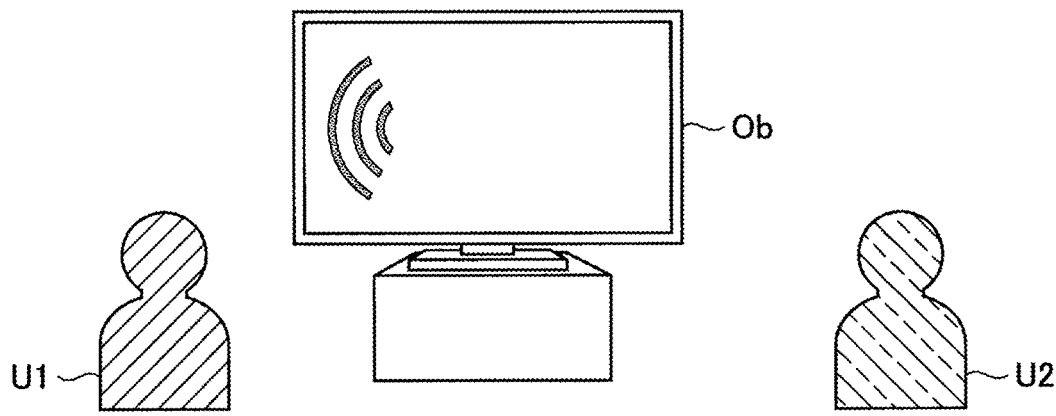
FIG. 9E is a diagram illustrating an example of display projected by the system according to the embodiment.

FIG. 9E illustrates an example in which display of a wave pattern is projected onto the display unit of the target device Ob to indicate the direction in which the user U1 is present. The wave pattern is represented by parts of arcs of three concentric circles having different radiuses. A direction in which an arcuate line gradually increases in length indicates the direction in which the user U1 is present to make it possible to simultaneously recognize the target device for which the user U1 has the operation authority and that the user U1 has the operation authority.

Figure 9F:
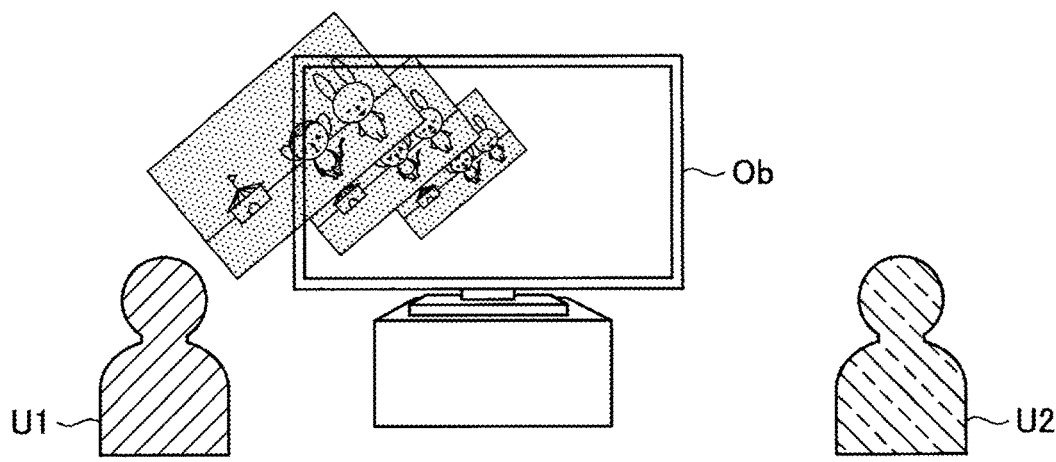
FIG. 9F is a diagram illustrating an example of display projected by the system according to the embodiment.

FIG. 9F illustrates a state in which content displayed by the target device Ob is reproduced as content having a plurality of large and small sizes and display in which large and small contents are superimposed in the user U1 direction in order form content having the smallest size while changing the tilt of the contents starting from the target device Ob is projected. A direction in which the center of the top content is present starting from the center of the bottom content among the superimposed contents indicates the direction of the user U1 to make it possible to simultaneously recognize the target device for which the user U1 has the operation authority and that the user U1 has the operation authority.

When the display is controlled in the vicinity of the target device Ob in this way, various display forms can be included. These display forms are selected as appropriate according to the environment information, the user information, and the device information. Display having high visibility can be selected for the user having the operation authority. The example explained above is only an example. The present disclosure is not limited to such an example.

<4.2. Projection Onto a Place Separated from the Target Device>

A case in which display is projected onto a place separated from the target device is explained. Such projection can be performed, for example, when there are three or more users or when the distance between the target device and the user is large. The case in which display is projected onto a place separated from the target device is explained with reference to FIG. 10.

Figure 10:
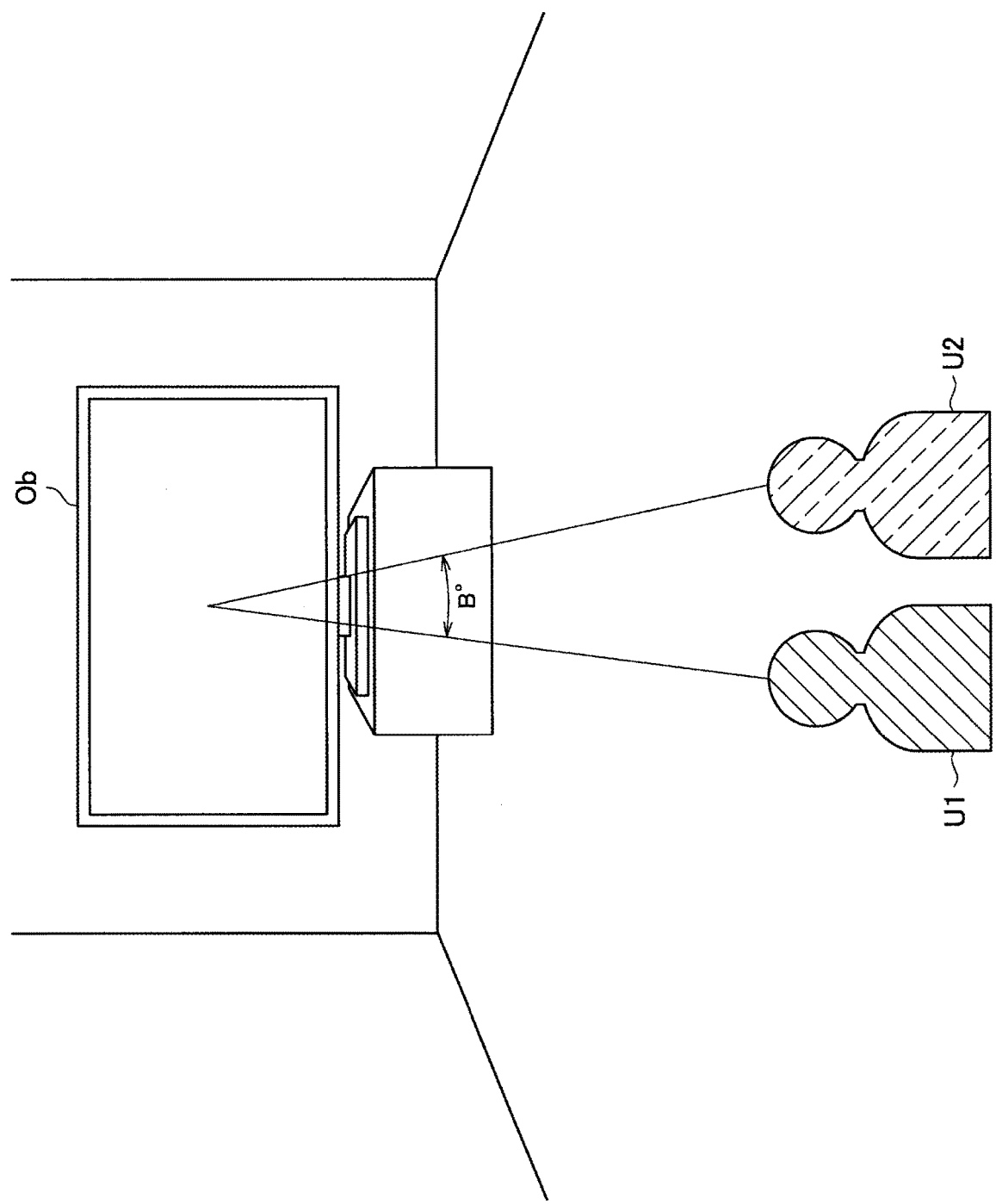
FIG. 10 is a conceptual diagram for explaining a concept of a place where projection is performed by the system according to the embodiment.

FIG. 10 illustrates a disposition example of the users U1 and U2 and the target device Ob. When the users U1 and U2 are present in the predetermined space, the display control unit 1111 controls display according to an angle B° formed by a straight line connecting the user U1 having the operation authority and the target device Ob and a straight line connecting the other user U2 not having the operation authority and the target device. In FIG. 5 and FIG. 10, there is a relation of A>B between the angles A° and B° respectively formed by the users U1 and U2. For example, when the positions of the user U1 and the user U2 become more distant from the target device Ob, the angle B° is considered to be smaller. In this case, it is difficult to distinguish the users U1 and U2 with display in only a direction starting from the target device Ob. When there are three or more users, it is likely that a plurality of users are indicated by the display only in the direction starting from the target device Ob. In such a case, the system 1000 may control display connecting the position of the target device Ob to the position of the user U1 having the operation authority with a straight line or a curved line.

Figure 11:
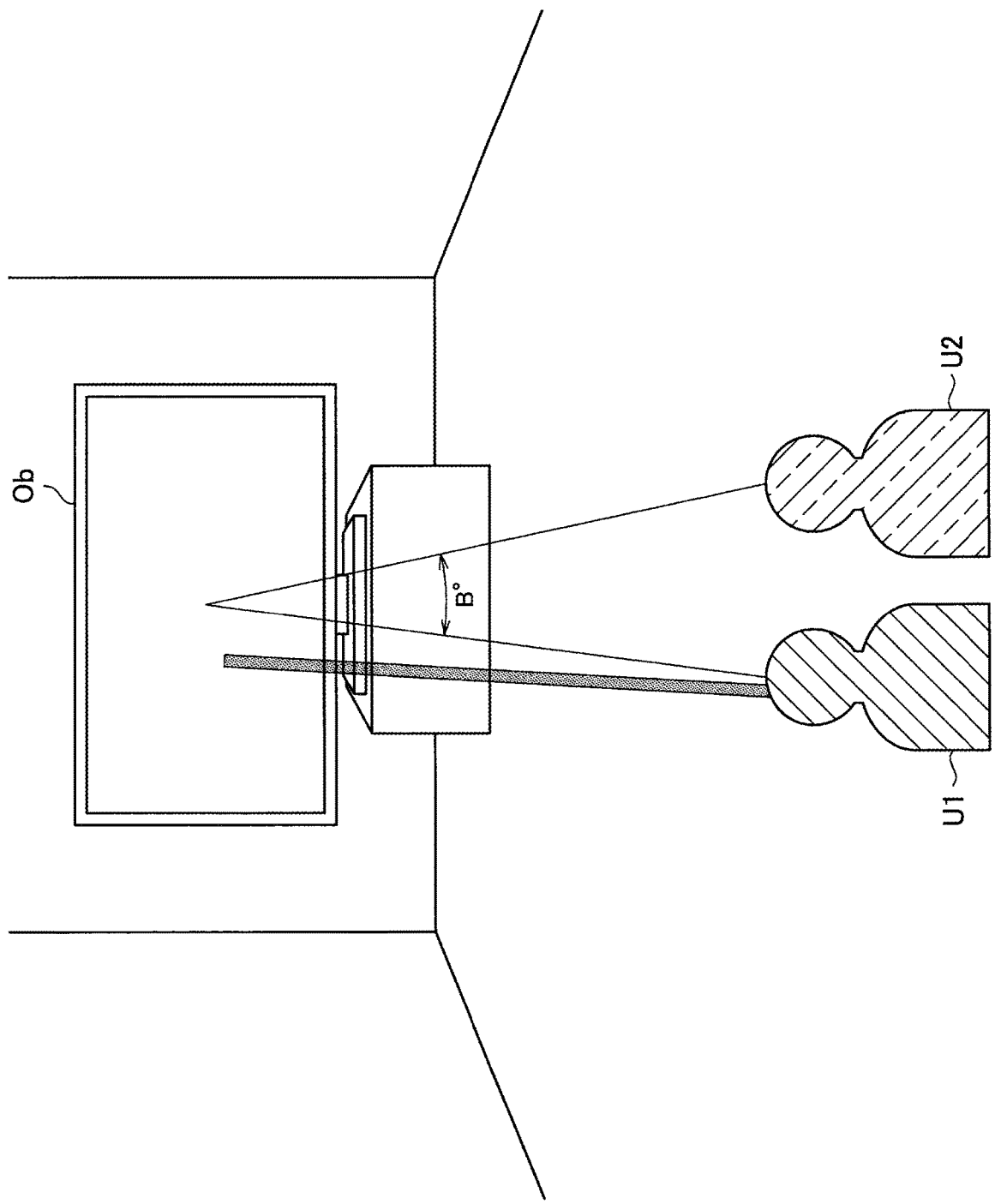
FIG. 11 is a diagram illustrating an example of display projected by the system according to the embodiment.

Display connecting the target device Ob to the user U1 having the operation authority starting from the target device Ob with a line segment or a curved line is explained with reference to FIG. 11. The line segment or the curved line only has to be display having a start point and an end point in the display region of the operation user and the operation target device and around the region and having continuity for connecting the start point and the end point. In FIG. 11, as in FIG. 10, between the users U1 and U2, there is a relation of the angle B° formed by a straight line connecting the user U1 having the operation authority and the target device Ob and a straight line connecting the other user U2 not having the operation authority and the target device. FIG. 11 is a diagram in which display connecting the user U1 and the target device Ob with a line is performed. When the user U1 and the target device Ob are connected by the line in this way, the user is capable of visually recognizing that the target device Ob is selected as the operation target and the user having the operation authority. With such display, it is possible to specify, with higher distinctiveness, that the user having the operation authority is the user U1.

Figure 12:
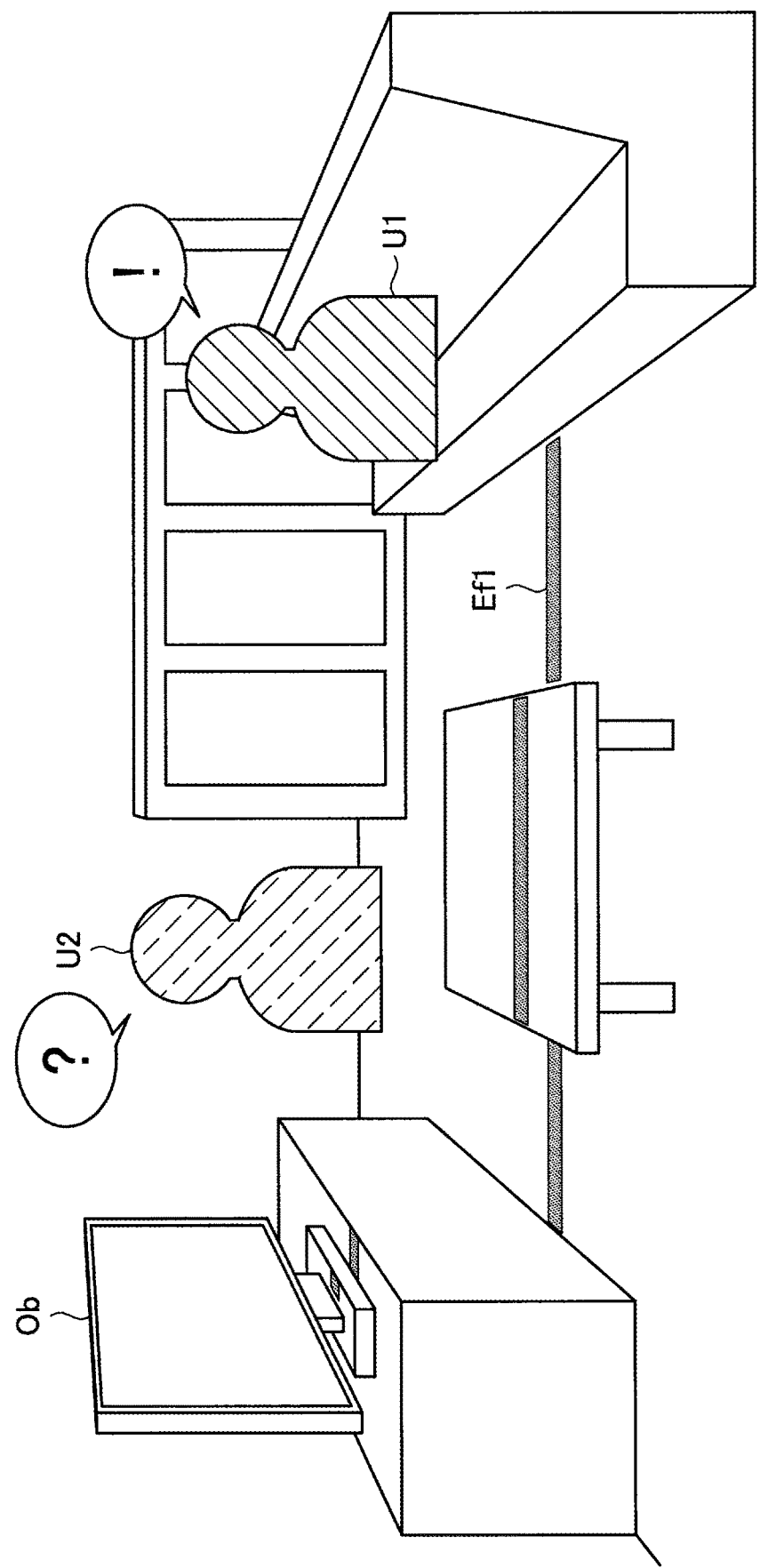
FIG. 12 is a diagram illustrating an example of display projected by the system according to the embodiment.

The display only has to be display having higher visibility for the user having the operation authority than the other users not having the operation authority in FIG. 12, an example in the case of display in which visibility for the user U1 is higher than visibility for the user U2 is illustrated.

In FIG. 12, display Ef1 is display connecting the user U1 and the target device Ob with a line segment. The target device Ob is a TV and is disposed on a TV table. A table is disposed between the user U1 and the target device Ob. The environment information includes a shape of the TV table present between the user U1 and the target device Ob, information concerning the display unit, and information concerning the table and includes depth information and the like. Therefore, the display control unit 1111 can control the display such that the user U1 can visually recognize the line segment of the display an as one connected line segment at the place where the TV table and the table are disposed. In this case, for the user U2, who visually recognizes the display from an angle different from the angle of the user U1, since the line segment is visually recognized in a divided state, it is difficult to grasp what the line segments mean. For example, such display has higher visibility for the user U1 than the user U2.

In FIG. 12, the display Ef1 is the display connecting the user U1 and the target device Ob with the line segment. However, the display is not limited to the line segment and only has to be display that is not broken when viewed from the visual point of the user U1.

FIG. 13 is a diagram illustrating a concept concerning the user U1 and display. Irrespective of a form of the display, the user U1 only has to be able to visually recognize the display and the visibility for the user U1 only has to be higher than the visibility for the other user. For example, an environment in which objects X1, X2, and X3 having a distance difference are present between the user U1 and the target device Ob is assumed. For example, when display Ef2 continuous across the objects X1, X2, and X3 is presented, the display Ef2 can be recognized as a continuous straight line when viewed from the user U1 side. This display allows the user U1 to visually recognize continuous display by projecting the display Ef2 corresponding to a distance from the user U1 or an eye line onto the objects X1, X2, and X3 using depth information or the like concerning a shape of an object in the predetermined space included in the environment information. With such a configuration, broken display is seen for the other user who visually recognizes the display from another angle. The display is meaningless for the other user. Using such a display method allows the user U1 to visually recognize display with high visibility irrespective of the number, the sizes, and the shapes of objects in the predetermined space.

In FIG. 14A, a case in which a curved line is used in a part of a line segment as the display connecting the user U1 and the target device Ob is illustrated. When the user U1 and the target device Ob are connected by a line segment of a straight line, the connection of the target device Ob and the user U1 may be difficult to see because of a blocking object X1. In this case, the display may be created as a curved line that avoids the blocking object X1. However, a start point and an end point of the curved line are respectively controlled to be the target device Ob and the user U1. Consequently, the system 1000 is capable of improving visibility of the display. When the influence of blocking of the display by the blocking object X1 is large and the visibility of the display for the user U1 is extremely low, for example, presentation by sound may be performed for the user U1 instead of the display or together with the display to cause the user U1 to recognize that the user U1 has the operation authority for the target device Ob. For example, the system 1000 may cause, with representation having directivity in which sound effect or the like is used, the user U1 to recognize that the user U1 has the operation authority for the target device Ob.

FIG. 14B illustrates a case in which, when a blocking user U3 is present in the line segment of the straight line connecting the target device Ob and the user U1, linear display passing through the blocking user U3 is controlled. By performing the display in a form of passing through the blocking user U3, it is possible to more intuitively improve the visibility of the display for the user U1.

Figure 14C:
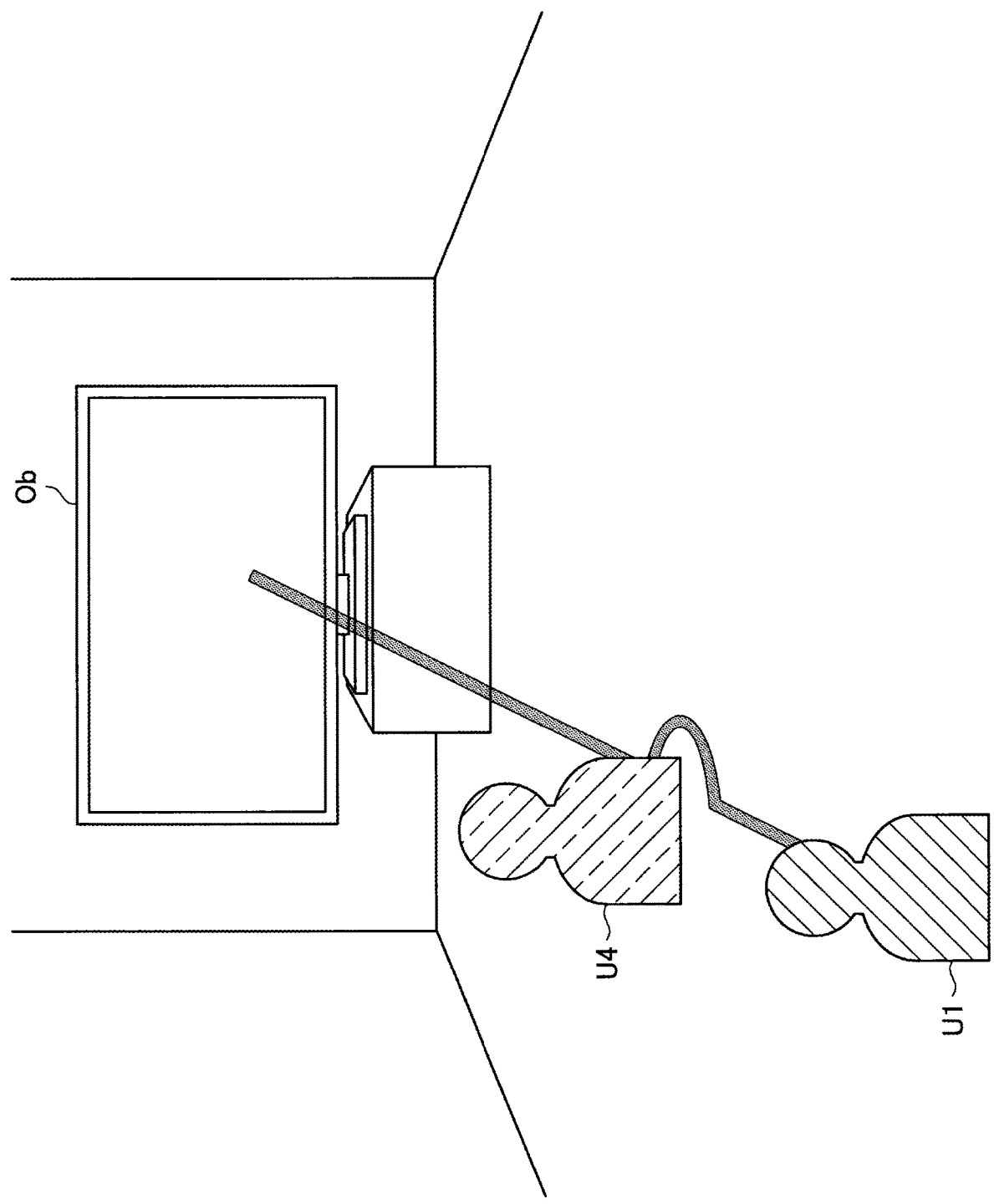
FIG. 14C is a diagram illustrating an example of display projected by the system according to the embodiment.
Figure 14D:
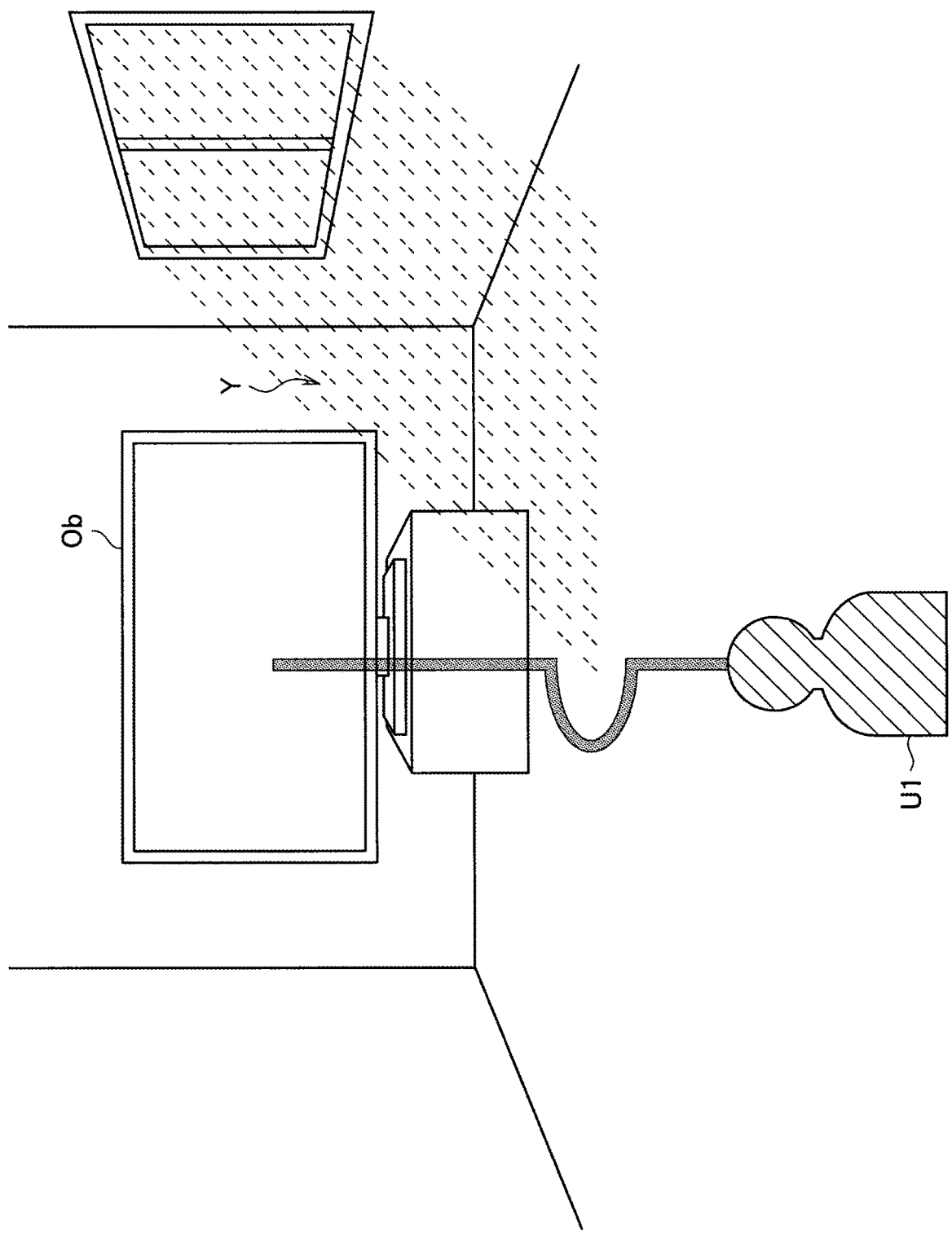
FIG. 14D is a diagram illustrating an example of display projected by the system according to the embodiment.

FIG. 14C illustrates a case in which the blocking object X1 in FIG. 14A is a blocking user U4. By performing display avoiding the blocking user U4, it is possible to reduce likelihood of erroneously recognizing that the user U4 has the operation authority.

FIG. 4D illustrates a case in which display control for curved line display is performed according to environment light. The environment information includes illuminance information in the predetermined space. The system 1000 may control display based on the illuminance information. For example, when display is projected onto a region Y where sunlight shines on and illuminance is high, it is hard to see the projected display. In order to suppress the hardness to see the projected display, the display may be performed in a region where illuminance is lower. Consequently, the system 1000 can improve visibility of the display for the user U1.

Figure 15A:
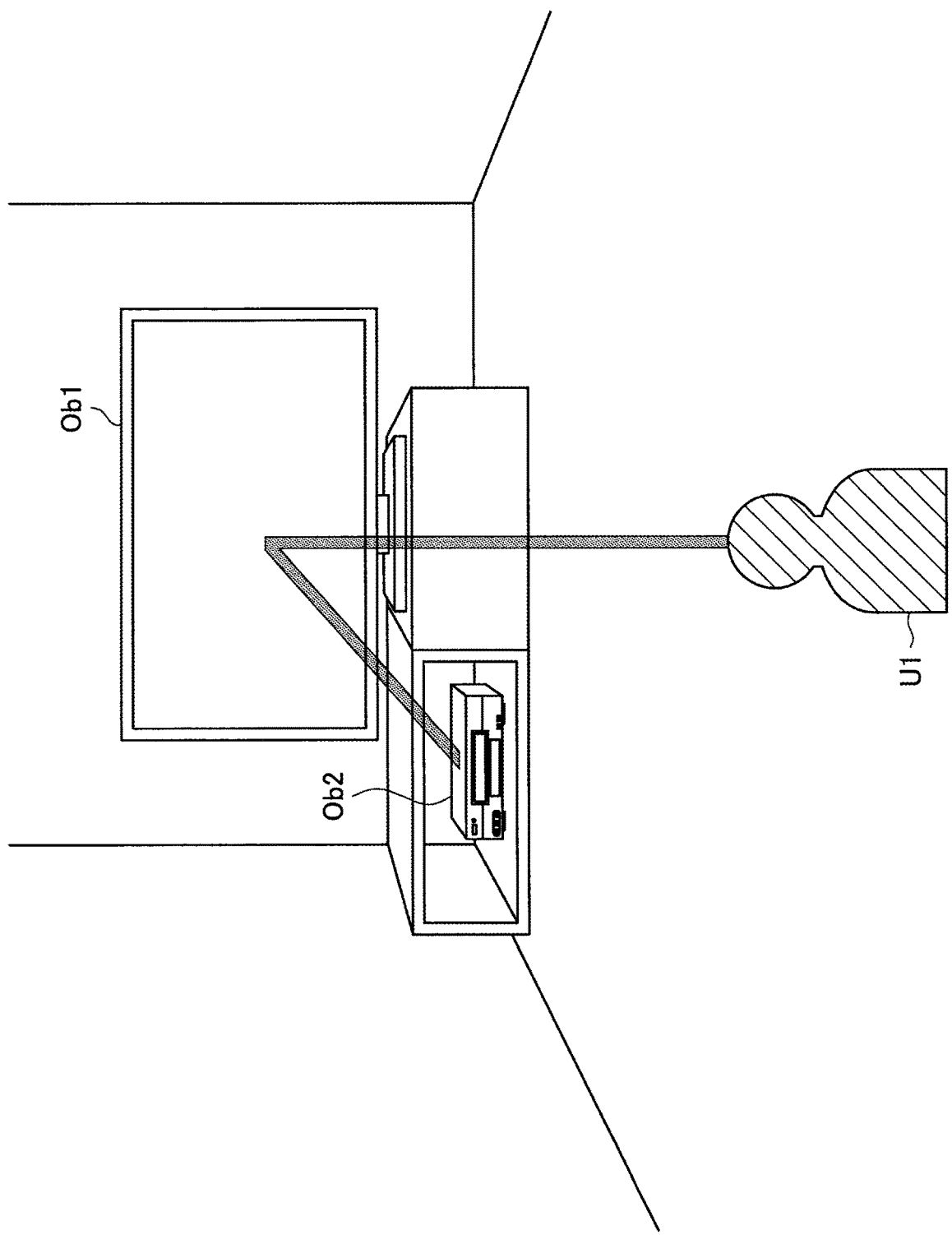
FIG. 15A is a diagram illustrating an example of display projected by the system according to the embodiment.

The case in which one target device Ob is present is explained above. However, a plurality of target devices Ob may be present. FIG. 15A is a diagram illustrating an example of display in the case in which a plurality of operation target devices are present. In FIG. 15A, when the user has the operation authority for a plurality of target devices, display is controlled to connect the target devices with a line segment or a curved line. For example, in FIG. 15A, the user U1 has the operation authority for a target device Ob1 and a target device Ob2. In this case, the display may be controlled such that the target device Ob1 and the target device Ob2 are connected by a line segment or a curved line. The display may be controlled such that the target device Ob1, the target device Ob2, and the user U1 are connected by display branching halfway in the connected line segment. With such a configuration, even if a plurality of target devices having the operation authority are present, it is possible to indicate to the user U1 that the user U1 has the operation authority.

Figure 15B:
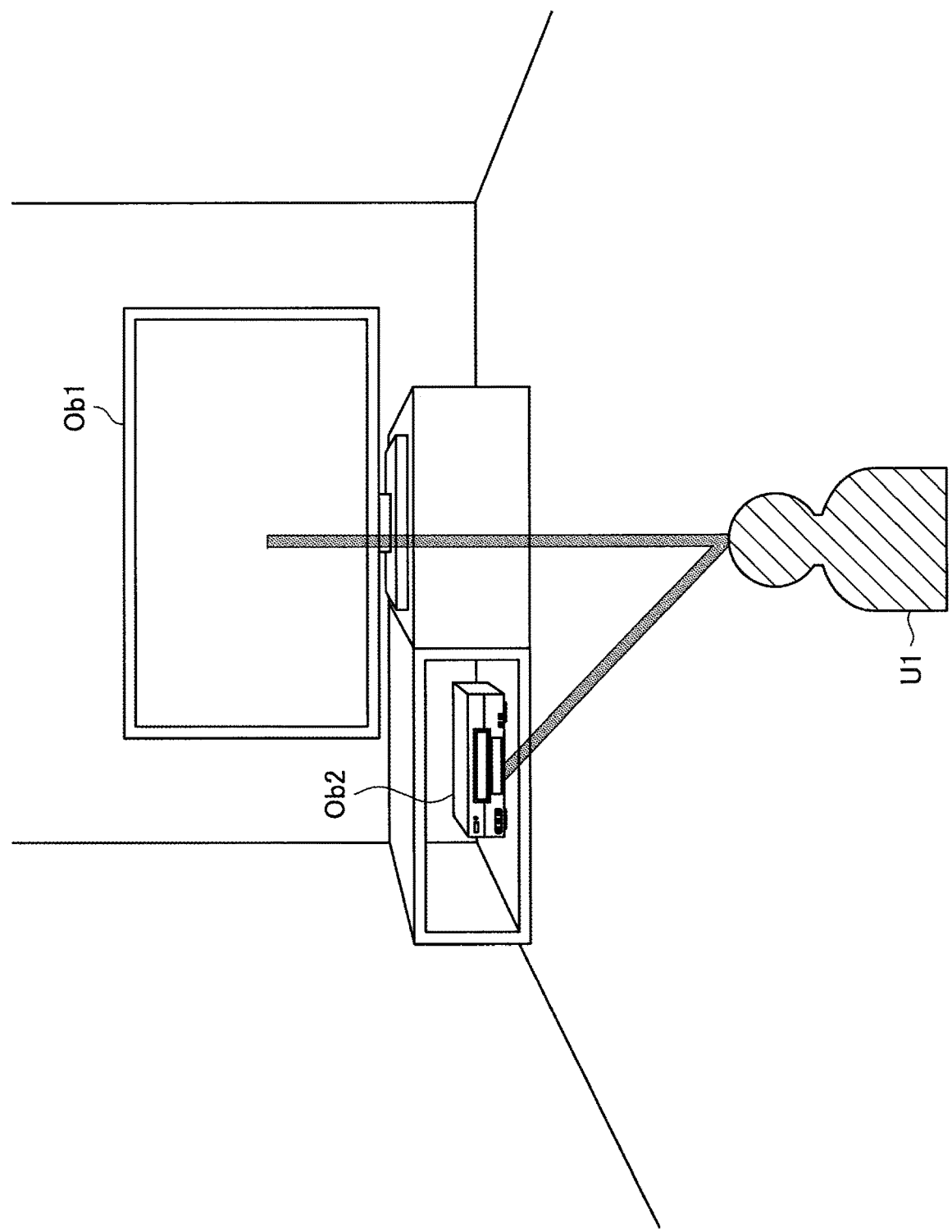
FIG. 15B is a diagram illustrating an example of display projected by the system according to the embodiment.

FIG. 15B is a diagram illustrating an example in which display connecting the user U1 and the target devices Ob1 and Ob2 when a plurality of target devices Ob are present is different from the display illustrated in FIG. 15A. When a plurality of target devices are present, display control may be performed by line segments connecting the respective target devices Ob1 and Ob2 respectively to the user U1. Consequently, when a plurality of target devices are adjacent, it is possible to suppress likelihood that display overlaps and visibility of the display for the user U1 is improved by connecting the target devices.

<4.3. Case in Which Display is Performed by a Smartphone or an HMD>

The case in which the display in the predetermined space is controlled via the projector 1210 and the target device Ob is explained above. However, these displays may be controlled through a display unit of a smartphone or may be controlled through a display unit of a head mounted display (HMD). That is, these displays may be displayed and controlled on a virtual space of the smartphone, the HMD, or the like.

For example, when the user U1 visually recognizes the predetermined space through the smartphone, the display control unit 1111 of the system 1000 may perform control of the display for the display unit of the smartphone based on the environment information, the user information, and the device information. A user holding the smartphone may be a user having the operation authority or may be a user not having the operation authority. The display control unit 1111 may perform the control of the display for the display unit of the smartphone based on the environment information, the user information, and the device information according to a viewing direction of the user, the position of the smartphone, and position information of the user.

For example, when the user U1 visually recognizes the predetermined space via the display unit of the HMD worn by the user U1, the display control unit 1111 of the system 1000 may perform, in the same manner as for the smartphone, the control of the display for the display unit of the HMD according to a viewing direction of the user, the position of the target device, the position of the HMD, and position information of the user.

5. Modification

<5.1. Case in which the Operation Authority is Transferred>

In the above explanation, the display control unit. 1111 controls the display indicating that the target device Ob is selected and the user having the operation authority is the user U1. A case in which the operation authority is transferred to another user before operation is performed is explained.

The operation authority may be transferred before the operation target device Ob is operated. For example, the user U1 selects the target device and transfers the operation authority to the user U2 without performing the operation of the target device, whereby the user U2 may acquire the operation authority and execute the operation of the target device. FIG. 16 is a diagram illustrating a conceptual diagram in which the operation authority is transferred. In FIG. 16, the user U1 selects the target device Ob to thereby pull an operation screen S of the target device Ob closer to the user U1. The user U1 can pass the operation screen S (that is, the operation authority for the target device Ob) to the hand of the user 2 by sliding a hand in the direction of the user 2 on the operation screen S pulled closer to the user U1. When the transfer of the operation screen S is performed, for example, a line segment Ef3 connecting the user U1 and the target device Ob may be switched to a line segment Ef4 connecting the user 2 and the target device Ob.

In FIG. 17, a case in which two users are present is explained. However, three users may be present in the predetermined space. In this case, a user can transfer the operation authority for the target device Ob to any user by sliding a hand on the operation screen S in the direction of the any user.

In the above explanation, the case in which one user has the operation authority is explained. However, in the technique of the present disclosure, the user having the operation authority is not limited to one user and may be a plurality of users. At this time, the display may indicate directivity to the plurality of users. For example, when the plurality of users have the operation authority for one target device, the display may indicate, to the plurality of users, a direction from the position of the target device to the position of an operation user.

The display for the plurality of users having the operation authority may be different from one another. For example, when a first user having the operation authority is present closer to an operation target device than a second user, it is possible to indicate that the first user has the operation authority by performing display in the vicinity of the target device. At this time, when the second user having the operation authority is present in a place farther from the operation target device than the first user, it is possible to indicate that the second user has the operation authority by performing display having continuity such as a line segment or a curved line connecting the second user and the operation target device. In this way, the display may be the different displays for the plurality of users having the operation authority.

Other examples of the different displays for the plurality of users having the operation authority include a case in which, when the target device is operated, order of operation is present among the plurality of users having the operation authority. Display in that case may represent the order of operable users, such as performing, line segment display connecting a user capable of operating the target device first and the target device and performing line segment display connecting a user capable of operating the target device second and the target device so as to branch from the line segment.

The display control unit 1111 may perform the display control using display forms set by the plurality of users in advance. For example, the display control unit 1111 may perform different displays according to the respective users by, when the users set favorite display forms, for example, using line segment display for a user for whom the line segment display is set and using curved line display for a user for whom the curved line display is set.

<5.2. Case in which Operation to a Target Device is Unrecognizable>

Next, diversity of display is explained. In the case explained above, the trigger operation of the user U1 is detected, the analyzing unit 1115 performs the analysis and specifies the target device Ob and the user U1 having the operation authority, and the display control unit 1111 performs the control of the display based on the position information of the target device Ob and the user U1 having the operation authority.

A display example in the case in which, although detection of a trigger is performed, the system 1000 is incapable of recognizing operation performed by a user is explained below. Specifically, although the analyzing unit 1115 specifies an operation user and an operation target device out of one or more target devices and one or more users, operation after the specification cannot be recognized. At this time, display may be display not having directivity. In such a case, the user U1 cannot operate the target device. Therefore, display not having directivity of the target device and the user may be presented for the purpose of distinguishing this case from a case in which the user surely has the operation authority. Specific examples of displays not having directivity are illustrated in FIG. 17A to FIG. 17H.

Figure 17A:
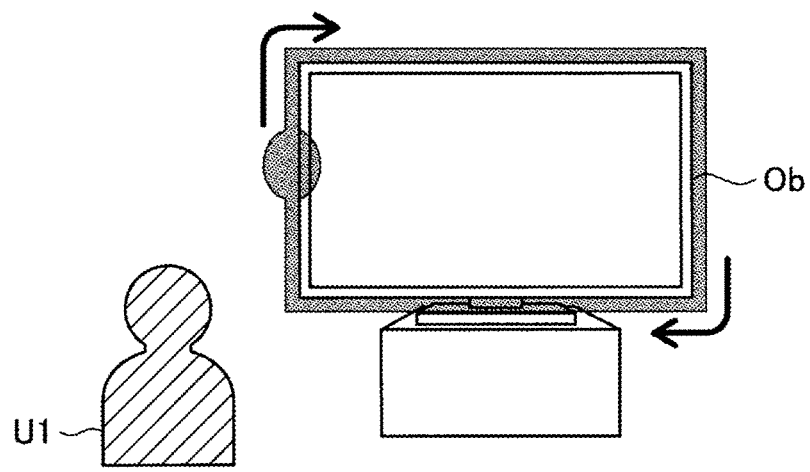
FIG. 17A is a diagram illustrating an example of display projected by the system according to the modification.

FIG. 17A is an example in which projection of display is performed over the vicinity of the target device Ob, in particular, the vicinity of the entire periphery of the frame unit and projection of display in which ball-like display moves around on the frame unit is performed. In the moving around display, since directivity always moves, representation not having directivity can be performed. The system 1000 may indicate, with this display, that operation to the target device is unrecognizable.

Figure 17B:
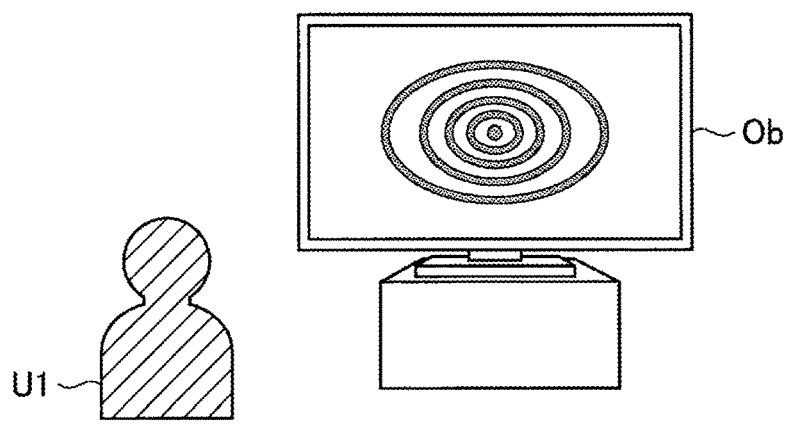
FIG. 17B is a diagram illustrating an example of display projected by the system according to the modification.

FIG. 17B is an example of performing display with elliptical representations having different diameters superimposed on the display unit of the target device Ob. The ellipses have the same center positions and are different from the representation illustrated in FIG. 9B in which the ellipses have directivity in the positions of the ellipses. By performing display not imparting directivity to the elliptical representations, the system 1000 may indicate that operation to the target device is unrecognizable.

Figure 17C:
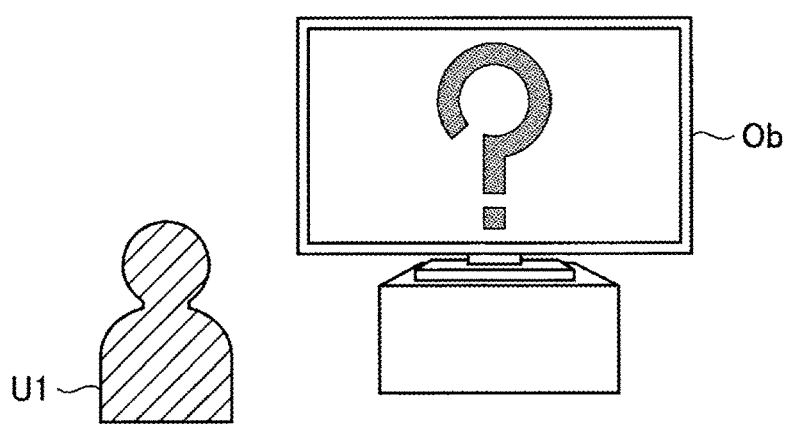
FIG. 17C is a diagram illustrating an example of display projected by the system according to the modification.

FIG. 17C is an example in which specific display such as a question mark is performed on the display unit of the target device Ob. By showing the specific display such as the question mark, the system 1000 may indicate that operation to the target device is unrecognizable. The display is not limited to the question mark and may be content indicating that operation from the user cannot be recognized.

Figure 17D:
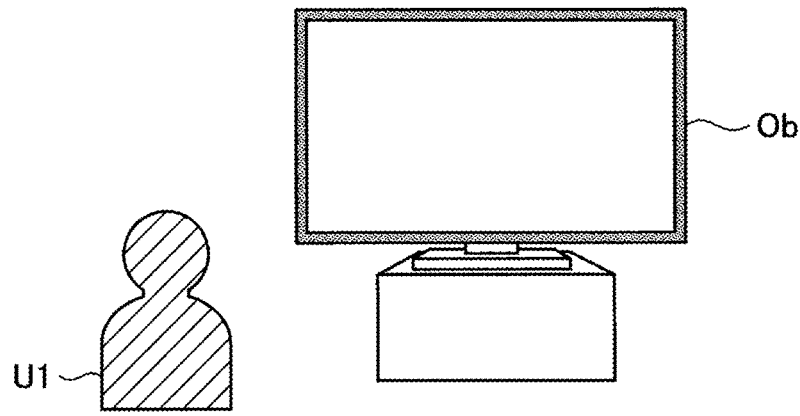
FIG. 17D is a diagram illustrating an example of display projected by the system according to the modification.

In FIG. 17D, display is projected over the entire periphery of the frame unit of the target device Ob. The system 1000 may indicate, with this display, that operation to the target device is unrecognizable.

Figure 17E:
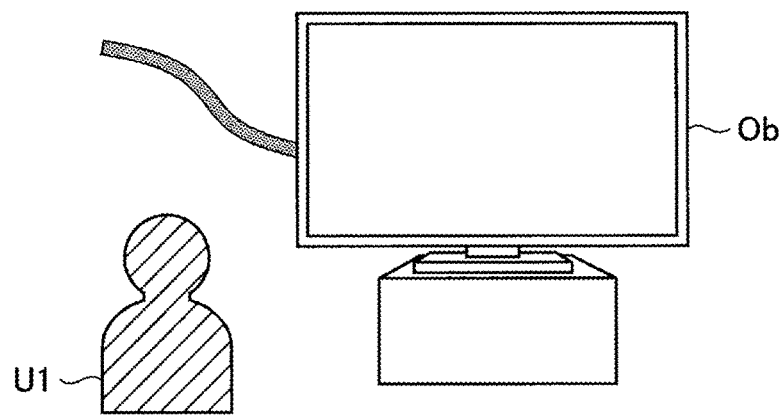
FIG. 17E is a diagram illustrating an example of display projected by the system according to the modification.

FIG. 17E is an example in which display for extending a line segment in a direction, which is not a direction to a position where the user is present, from the position of the target device Ob is performed in the vicinity of the target device Ob. The line segment may be a straight line or may be a curved line. By using the display for not extending the line segment to the user who can have the operation authority, the system 1000 may indicate that operation to the target device is unrecognizable.

Figure 17F:
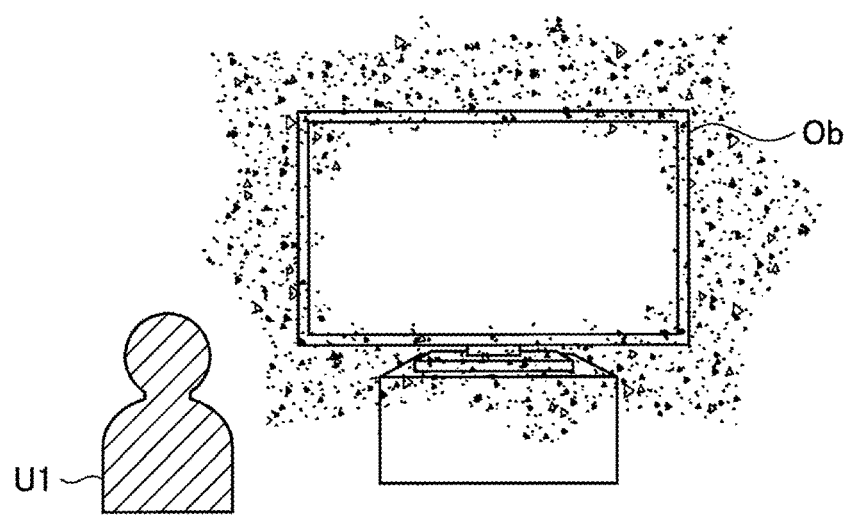
FIG. 17F is a diagram illustrating an example of display projected by the system according to the modification.

FIG. 17F is an example in which display of particles is projected in the vicinity of the target device Ob or on the display region of the display unit. The particles are scattered over the entire periphery of the target device Ob without being unevenly distributed and are display not having directivity. The system 1000 may indicate, with such display, that operation to the target device is unrecognizable.

Figure 17G:
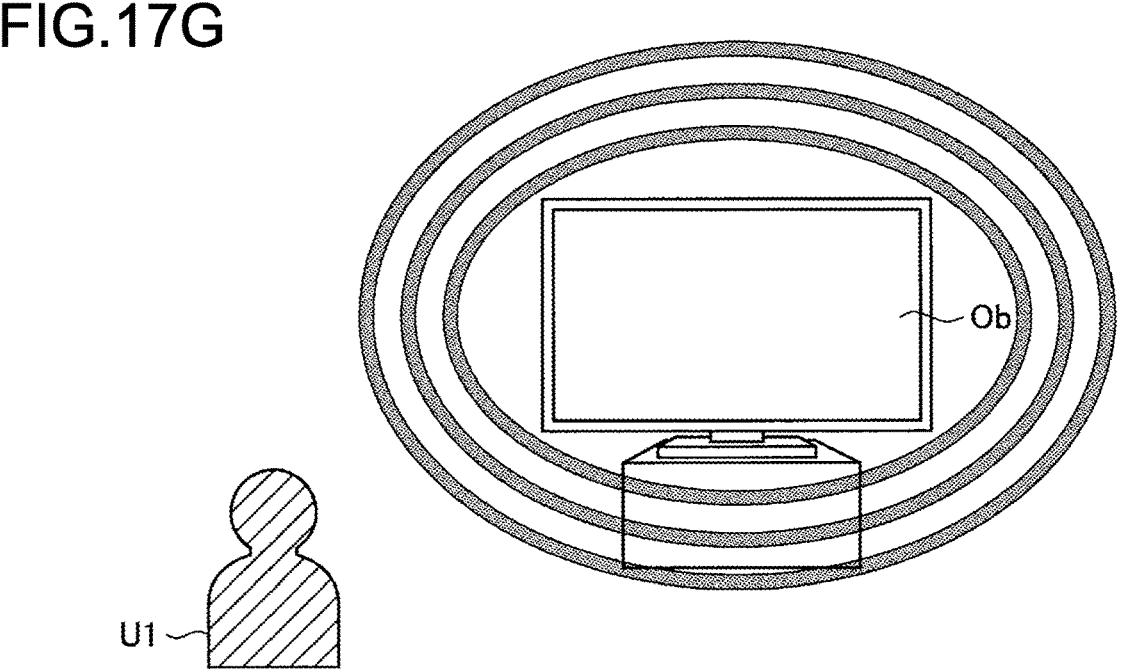
FIG. 17G is a diagram illustrating an example of display projected by the system according to the modification.

FIG. 17G is an example in which ellipses having different sizes are displayed to surround the target device Ob in the vicinity of the target device Ob. Unlike the display indicating directivity, because center positions of the ellipses are different as illustrated in FIG. 9B, in FIG. 17G, the ellipses have the same center position and do not indicate directivity. The system 1000 may indicate, with such display, that operation to the target device is unrecognizable.

Figure 17H:
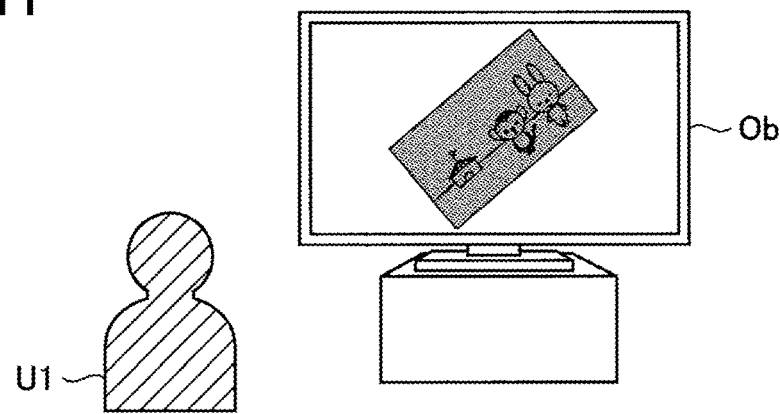
FIG. 17H is a diagram illustrating an example of display projected by the system according to the modification.

FIG. 17H is an example in which displayed content is not projected toward the user U1 unlike FIG. 9F and display not moving from the display unit of the target device Ob is performed. The system 1000 may indicate, with such display, that operation to the target device is unrecognizable.

The representations not indicating directivity are explained above using the specific examples. However, the display may be any display as long as the display does not indicate directivity to the user U1. The display is not limited to the examples explained above.

<5.3. Case in which a Target Device is Locked Against a Certain User>

When the target device is locked against a certain user (when the target device is an inoperable state), in addition to the displays indicating the directivity illustrated in FIG. 9A to FIG. 9F, specific display such as a key mark indicating a lock state may be added to perform display. The display may be displays obtained by adding specific display to the displays having directivity illustrated in FIG. 9A to FIG. 9F or may be displays obtained by adding specific display to the displays not having directivity illustrated in FIG. 17A to FIG. 17H.

FIG. 18A to FIG. 18H illustrate display examples in the case in which operation of the target device Ob is locked against the user U1.

Figure 18A:
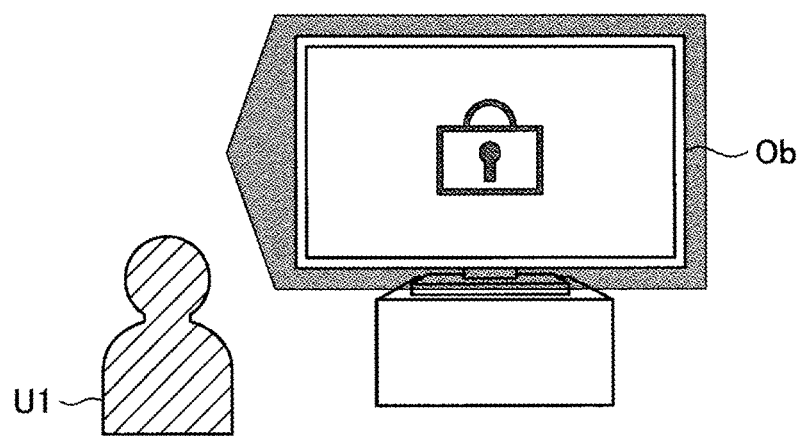
FIG. 18A is a diagram illustrating an example of display projected by the system according to the modification.

FIG. 18A is a diagram illustrating an example in which a specific mark such as a key mark is further added in addition to the display illustrated in FIG. 9A. This display may indicate, to the user U1, the target device selected by the user U1 and that the user U1 has performed the selection and that operation of the target device is locked.

Figure 18B:
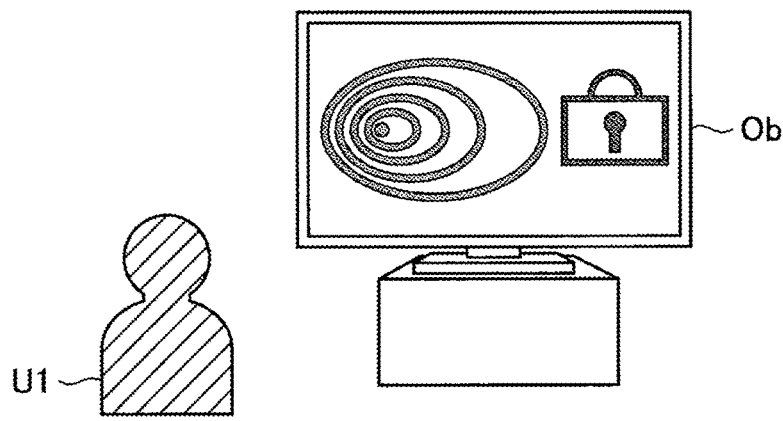
FIG. 18B is a diagram illustrating an example of display projected by the system according to the modification.

FIG. 18B is a diagram illustrating an example in which a specific mark such as a key mark is further added in addition to the display illustrated in FIG. 91B. This display may indicate, to the user U1, the target device selected by the user U1 and that the user U1 has performed the selection and that operation of the target device is locked.

Figure 18C:
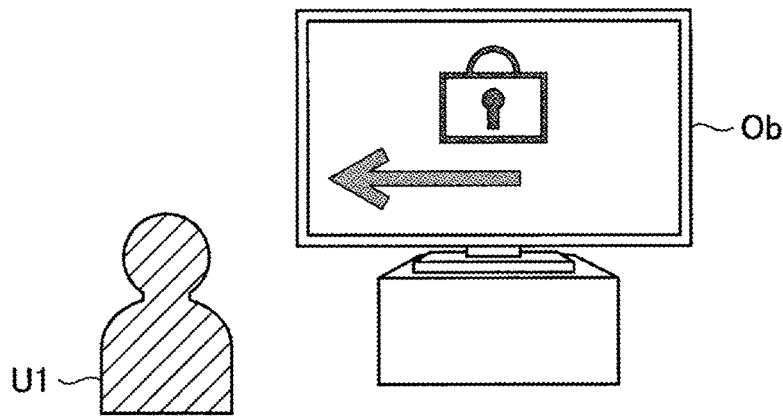
FIG. 18C is a diagram illustrating an example of display projected by the system according to the modification.

FIG. 18C is a diagram illustrating an example in which a specific mark such as a key mark is further added in addition to the display illustrated in FIG. 9C. This display may indicate, to the user U1, the target device selected by the user U1 and that the user U1 has performed the selection and that operation of the target device is locked.

Figure 18D:
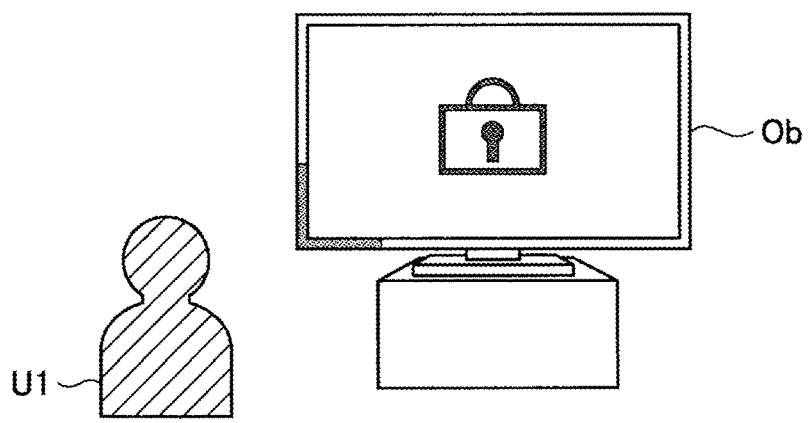
FIG. 18D is a diagram illustrating an example of display projected by the system according to the modification.

FIG. 18D is a diagram illustrating an example of display in which display is projected onto an edge part of a frame unit of a housing of the target device Ob to indicate a direction in which the user U1 is present in an edge part direction. A specific mark such as a key mark may be further added on the display unit of the target device Ob in addition to this display to indicate, to the user U1, the target device selected by the user U1 and that the user U1 has performed the selection and that operation of the target device is locked.

Figure 18E:
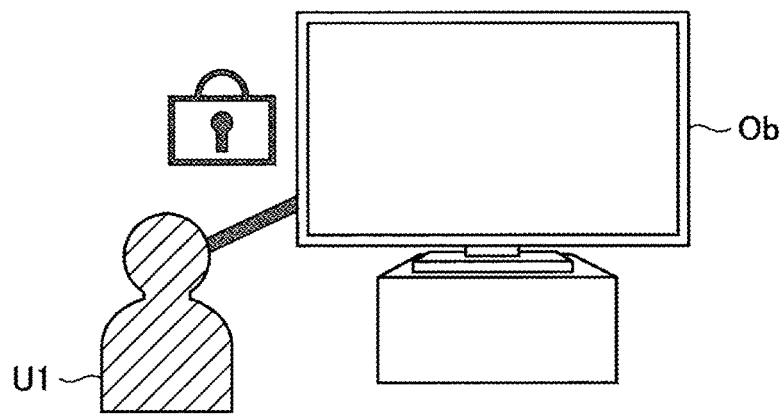
FIG. 18F is a diagram illustrating an example of display projected by the system according to the modification.
FIG. 18G is a diagram illustrating an example of display projected by the system according to the modification.
FIG. 18H is a diagram illustrating an example of display projected by the system according to the modification.

FIG. 18E is a diagram illustrating an example of display in which display connecting the target device Ob and the user U1 is performed to indicate the target device selected by the user U1 and that the user U1 has performed the selection. A specific mark such as a key mark may be further added in addition to the display to indicate, to the user U1, the target device selected by the user U1 and that the user U1 has performed the selection and that operation of the target device is locked.

Figure 18F:
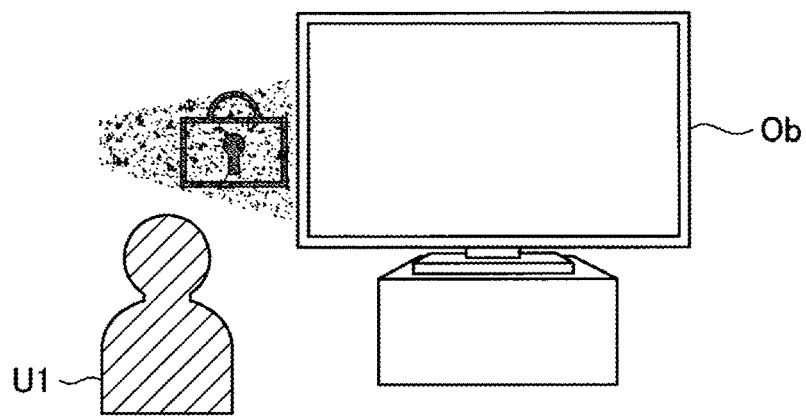

FIG. 18F is a diagram illustrating display in which a specific mark such as a key mark is further added to be superimposed on particles in addition to the display illustrated in FIG. 9D. This display may indicate, to the user U1, the target device selected by the user U1 and that the user U1 has performed the selection and that operation of the target device is locked.

Figure 18G:
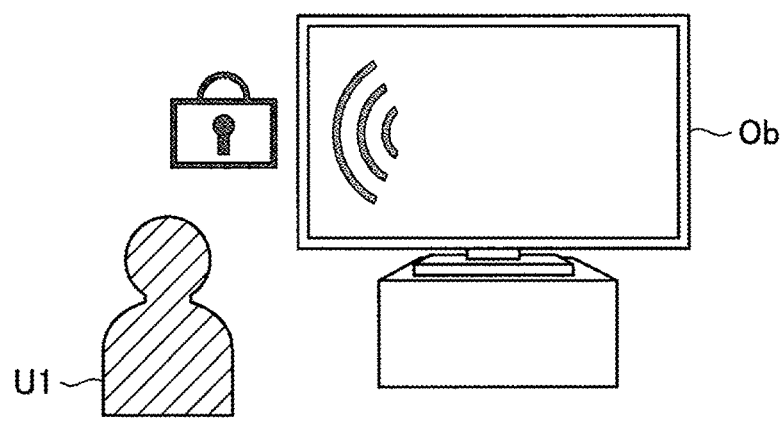

FIG. 18G is a diagram illustrating display in which a specific mark such as a key mark is added in addition to FIG. 9E. This display may indicate, to the user U1, the target device selected by the user U1 and that the user U1 has performed the selection and that operation of the target device is locked.

Figure 18H:
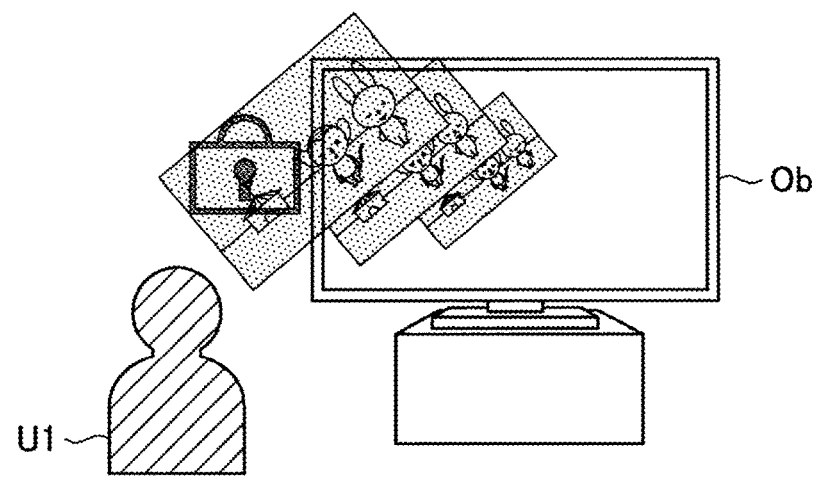

FIG. 18H is a diagram illustrating display in which a specific mark such as a key mark is further added in addition to FIG. 9F. This display may indicate, to the user U1, the target device selected by the user U1 and that the user U1 has performed the selection and that operation of the target device is locked.

Figure 19A:
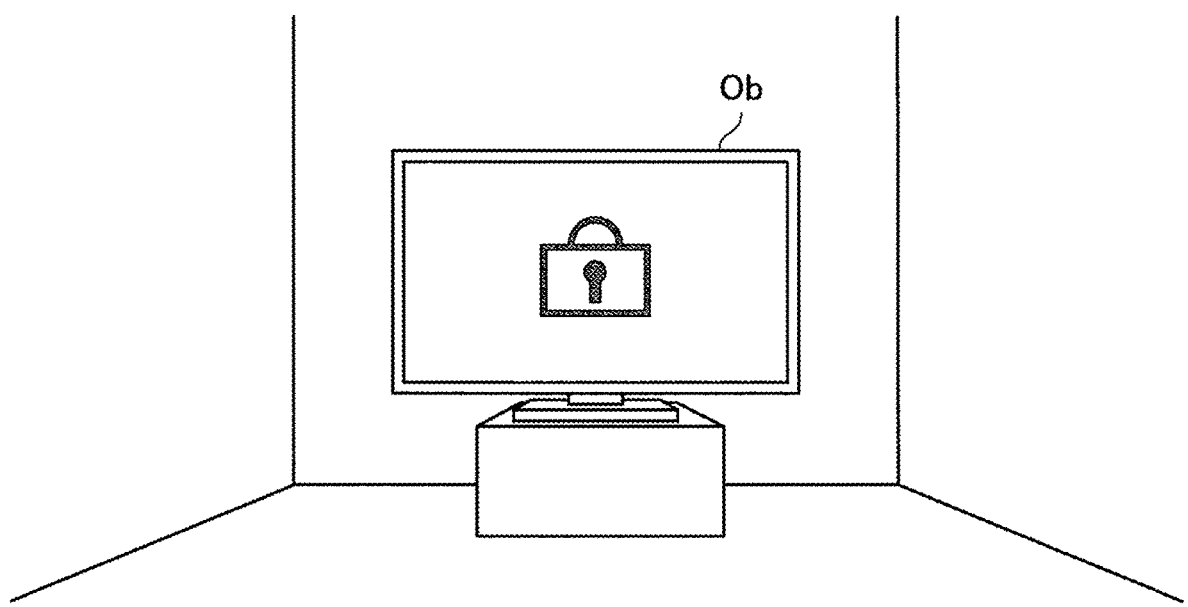
FIG. 19A is a diagram illustrating an example of display projected by the system according to the modification.

Whereas FIG. 18A to FIG. 18H are the displays indicating directivity to the user U1, FIG. 19A is an example indicating that the target device Ob is locked without indicating directivity to the user U1. In FIG. 19A, specific display such as a key mark is performed on the display unit of the target device Ob. This display may indicate that the operation of the target device Ob is locked.

Figure 19B:
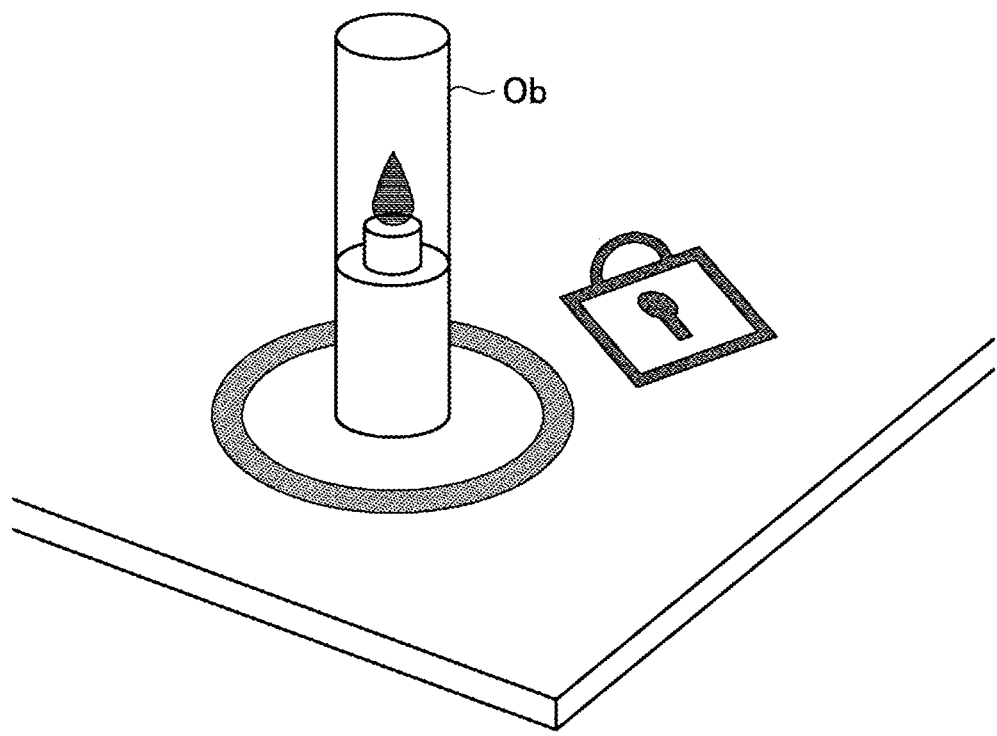
FIG. 19B is a diagram illustrating an example of display projected by the system according to the modification.

Like FIG. 19A, FIG. 19B is an example indicating that the target device Ob is locked without indicating directivity to the user. In FIG. 19B, since the target device Ob does not include the display unit, specific display such as a key mark is performed in addition to display surrounding the vicinity of the target device Ob. This display may indicate that the operation of the target device Ob is locked.

The key mark is an example of the specific mark in the above explanation. However, the specific mark is not limited to such an example as long as it can be grasped that the user U1 is locked. For example, display of characters or the like may be performed.

6. Hardware Configuration Example

Figure 20:
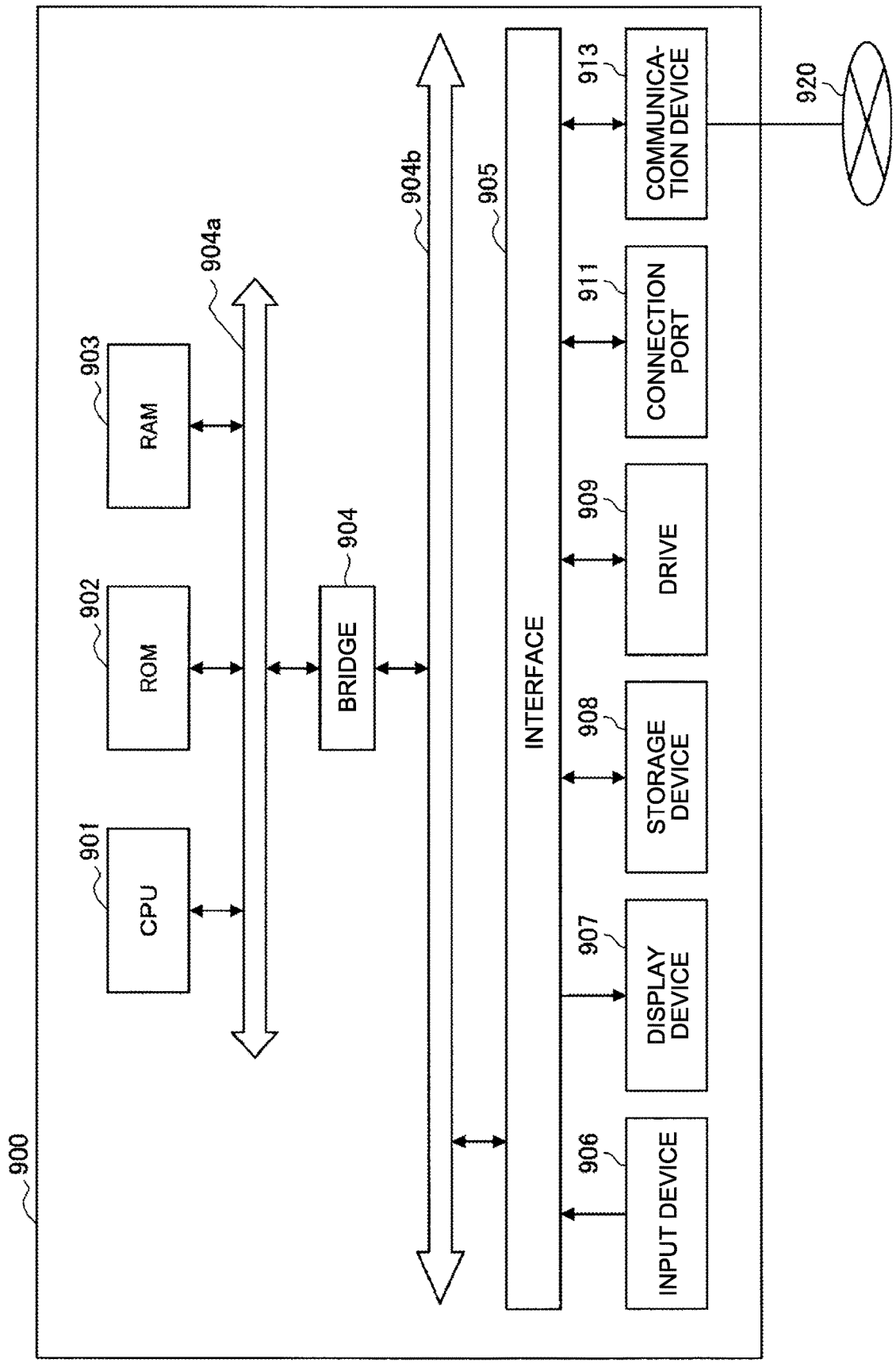
FIG. 20 is a block diagram illustrating an example of a hardware configuration of an information processing device according to the embodiment.

Lastly, a hardware configuration of the information processing device according to this embodiment is explained with reference to FIG. 20. FIG. 20 is a block diagram illustrating an example of the hardware configuration of the information processing device according to this embodiment. Note that an information processing device 900 illustrated in FIG. 20 can realize, for example, the information processing device 1100 illustrated in FIG. 3. Information processing by the information processing device 1100 according to this embodiment is realized by cooperation of software and hardware explained below.

As illustrated in FIG. 20, the information processing device 900 includes a central processing unit (CPU) 901, a read only memory (ROM) 902, a random access memory (RAM) 903, and a host bus 904a. The information processing device 900 includes a bridge 904, an external bus 904b, an interface 905, an input device 906, a display device 907, a storage device 908, a drive 909, a connection port 911, and a communication device 913. The information processing device 900 may include an electric circuit and a processing circuit such as a DSP or an ASIC instead of or together with the CPU 901.

The CPU 901 functions as an arithmetic processing device and a control device and controls the entire operation in the information processing device 900 according to various programs. The CPU 901 may be a microprocessor. The RUM 902 stores programs, arithmetic operation parameters, and the like used by the CPU 901. The RAM 903 temporarily stores programs used in execution by the CPU 901 and parameters and the like that change as appropriate in the execution. The CPU 901 can form, for example, the detecting unit 1120 and the control unit 1110 illustrated in FIG. 3.

The CPU 901, the ROM 902, and the RAM 903 are connected to one another by the host bus 904a including a CPU bus or the like. The host bus 904a is connected to the external bus 904b such as a peripheral component interconnect/interface (PCI) bus via the bridge 904. Note that the host bus 904a, the bridge 904, and the external bus 904b do not always need to be separated. Functions of the host bus 904a, the bridge 904, and the external bus 904b may be implemented in one bus.

The input device 906 is realized by a device to which information is input by a user such as a mouse, a keyboard, a touch panel, a button, a microphone, a switch, and a lever. The input device 906 may be, for example, a remote control device that uses an infrared ray and other radio waves or may be an externally connected device such as a cellular phone or a PDA adapted to operation of the information processing device 900. Further, the input device 906 may include, for example, an input control circuit and the like that generates an input signal based on information input by the user using the input means explained above and outputs the input signal to the CPU 901. The user of the information processing device 900 can input various data and instruct a processing operation to the information processing device 900 by operating the input device 906.

The display device 907 is formed by a device capable of visually or auditorily notifying the user of acquired information. As such a device, there are display devices such as a CRT display device, a liquid crystal display device, a plasma display device, an EL display device, a laser projector, an LED projector, and a lamp, sound output devices such as a speaker and a headphone, and the like. The display device 907 outputs, for example, results obtained by various kinds of processing performed by the information processing device 900. Specifically, the display device 907 visually displays, in various forms such as a text, an image, a table, and a graph, the results obtained by the various kinds of processing performed by the information processing device 900. On the other hand, when a sound output device is used, the sound output device converts an audio signal including reproduced sound data and audio data into an analog signal and auditorily outputs the analog signal.

The storage device 908 is a device for data storage formed as an example of a storing unit of the information processing device 900. The storage device 908 is realized by, for example, a magnetic storage device such as an HDD, a semiconductor storage device, an optical storage device, a magneto-optical storage device, or the like. The storage device 908 may include a storage medium, a recording device that records data in the storage medium, a readout device that reads out the data from the storage medium, a deleting device that deletes the data recorded in the storage medium, and the like. The storage device 908 stores programs and various data executed by the CPU 901, various data acquired from the outside, and the like. The storage device 908 can form, for example, the storing unit 1140 illustrated in FIG. 3.

The drive 909 is a reader writer for storage medium and is incorporated in or externally attached to the information processing device 900. The drive 909 reads out information recorded in a removable storage medium such as a magnetic disk, an optical disk, a magneto-optical disk, or a semiconductor memory inserted into the drive 909 and outputs the information to the RAM 903. The drive 909 can also write information in the removable storage medium.

The connection port 911 is an interface connected to an external device and is a connection port to an external device, the connection port being capable of transmitting data with, for example, a universal serial bus (USB) and the like. The connection port 911 can form, for example, the I/F unit 1130 illustrated in FIG. 3. The connection port 911 is connected to the display device 1200 and the sensor device 1300 illustrated in FIG. 3.

The communication device 913 is a communication interface formed by, for example, a communication device for connection to a network 920, and the like. The communication device 913 is, for example, a communication card for wired or wireless local area network (LAN), long term evolution (LTE), Bluetooth (registered trademark), wireless USB (WUSB), or the like. The communication device 913 may be a router for optical communication, a router for asymmetric digital subscriber line (ADSL), a modem for various kinds of communication, or the like. The communication device 913 can transmit and receive signals and the like, for example, between the communication device 913 and the Internet and other communication devices according to a predetermined protocol such as TCP/IP. The communication device 913 can form, for example, the I/F unit 1130 illustrated in FIG. 3. The communication device 913 can communicate with the display device 1200 and the sensor device 1300 illustrated in FIG. 3.

Note that the network 920 is a wired or wireless transmission line for information transmitted from a device connected to the network 920. For example, the network 920 may include public line networks such as the Internet, a telephone line network, and a satellite communication network, various local area networks (LANs) including Ethernet (registered trademark), a wide area network (WAN), and the like. The network 920 may include a leased line network such as an internet protocol-virtual private network (IP-VPN).

A computer program for causing the hardware such as the CPU, the ROM, and the RAM incorporated in the information processing device 1100 to exert functions equivalent to the functions of the components of the information processing device 1100 according to this embodiment explained above can also be created. A recording medium storing the computer program is also provided.

7. Summary

The embodiment of the present disclosure is explained in detail above with reference to FIG. 1 to FIG. 20. As explained above, the system 1000 according to this embodiment performs display corresponding to the positional relation between the target device and the user based on the position information of the target device and the position information of the user in the predetermined space. Consequently, it is possible to visually recognize the user having the operation authority for the target device and the target device before operation.

The preferred embodiment of the present disclosure is explained in detail above with reference to the accompanying drawings. However, the technical scope of the present disclosure is not limited to such an example. It is evident that those having ordinary knowledge in the technical field of the present disclosure can conceive of various change examples or correction examples within the scope of the technical idea described in the claims. These change examples or correction examples are also understood to naturally belong to the technical scope of the present disclosure.

Note that the devices explained in this specification may be realized as independent devices or a part or all of the devices may be realized as separate devices. For example, the information processing device 1100, the display device 1200, and the sensor device 1300 illustrated in FIG. 3 may be configured as independent devices. For example, the information processing device 1100 illustrated in FIG. 3 may be configured as a server device connected to the display device 1200 and the sensor device 1300 by a network or the like. For example, among the functional component examples of the information processing device 1100 illustrated in FIG. 3, the control unit 1110 may be included in a device such as a server connected to the I/F unit 1130 and the detecting unit 1120 by a network or the like.

The processing explained using the flowchart in this specification may not always be executed in the illustrated order. Several processing steps may be executed in parallel. Additional processing steps may be adopted or a part of the processing steps may be omitted.

The effects described in this specification are only explanatory or illustrative and are not limiting. That is, the technique according to the present disclosure can achieve, together with the effects described above or instead of the effects described above, other effects obvious for those skilled in the art from the description of this specification.

Note that configurations described below also belong to the technical scope of the present disclosure.

(1)

An information processing device comprising a display control unit that controls, based on position information of a target device in a predetermined real space and position information of a user having an operation authority for the target device, display corresponding to a positional relation between the user and the target device such that the user can visually recognize the display in the real space.

(2)

The information processing device according to (1), wherein the display control unit controls, based on selection of the target device, the display mutually associated with the user and the target device.

(3)

The information processing device according to (1) or (2), wherein the display is display representing a direction from a position of the target device to a position of the user.

(4)

The information processing device according to any one of (1) to (3), wherein the display is display having higher visibility for the user than another user not having the operation authority.

(5)

The information processing device according to any one of (1) to (4), wherein the display is a line segment or a curved line connecting the user and the target device.

(6)

The information processing device according to any one of (1) to (5), wherein the target device includes a display unit, and the display control unit causes the display unit to display the display.

(7)

The information processing device according to any one of (1) to (5), wherein the display control unit causes a projecting device to project the display.

(8)

The information processing device according to (7), wherein the projecting device includes a movable unit capable of changing a projecting direction, and the display control unit changes the projecting direction of the projecting device to change a projecting place for the display.

(9)

The information processing device according to (8), wherein the display control unit determines the projecting place based on environment information concerning the real space.

(10)

The information processing device according to (9), wherein the environment information includes luminance, a color, or sound in the real space or depth information concerning an object forming the real space.

(11)

The information processing device according to any one of (1) to (10), wherein the display control unit changes the display according to an angle formed by a straight line connecting the user having the operation authority and the target device and a straight line connecting another user not having the operation authority and the target device.

(12)

The information processing device according to (11), wherein, when the angle is larger than a predetermined angle, the display is displayed in a vicinity of the target device or to be superimposed on the target device and, when the angle is smaller than the predetermined angle, the display is displayed by a line segment or a curved line connecting the user and the target device.

(13)

The information processing device according to (6), wherein the display control unit selects, according to a ratio of a region where a display range of content displayed on the display unit of the target device occupies a display region of the display unit, whether to display the display in the display region of the display unit or display the display on an outer side of the display region.

(14)

The information processing device according to (13), wherein, when the display is displayed on the outer side of the display region, the display is projected by a projecting device.

(15)

The information processing de vice according to (2), wherein the selection of the target device is performed according to at least one of a gesture and a voice input of the user in a predetermined space.

(16)

The information processing device according to (5), wherein, when the user has the operation authority for a plurality of the target devices, the line segment or the curved line further includes a line segment or a curved line connecting the target devices.

(17)

The information processing device according to (5), wherein, when the operation authority is transferred from the user to another user, the display control unit changes display representing a direction from a position of the target device to a position where the user is present to display representing a direction in which the other user is present.

(18)

The information processing device according to (8), wherein the display control unit causes the projecting device to project the display to be superimposed on a housing of the target device or onto a vicinity of the housing of the target device.

(19)

An information processing method comprising controlling, based on position information of a target device in a predetermined real space and position information of a user having an operation authority for the target device, display corresponding to a positional relation between the user and the target device such that the user can visually recognize the display in the real space.

(20)

A recording medium recording a program for causing a computer to function as a display control unit that controls, based on position information of a target device in a predetermined real space and position information of a user having an operation authority for the target device, display corresponding to a positional relation between the user and the target device such that the user can visually recognize the display in the real space.

REFERENCE SIGNS LIST

1000 SYSTEM
1100 INFORMATION PROCESSING DEVICE
1110 CONTROL UNIT
1111 DISPLAY CONTROL UNIT
1115 ANALYZING UNIT
1120 DETECTING UNIT
1121 USER DETECTING UNIT
1123 TRIGGER. DETECTING UNIT
1125 ENVIRONMENT DETECTING UNIT
1126 DEVICE DETECTING UNIT
1130 I/F UNIT
1140 STORING UNIT
1200 DISPLAY DEVICE
1300 SENSOR DEVICE

The invention claimed is:

1. An information processing device comprising
a display control unit configured to control, based on position information of a target device in a predetermined real space and position information of a user having an operation authority for the target device, display representing a positional relation between a position of the user and a position of the target device such that the user can visually recognize the display in the real space,
wherein the display control unit is further configured to control, based on selection of the target device, the display mutually associated with the user and the target device, and
wherein the display control unit is implemented via at least one processor.

2. The information processing device according to claim 1, wherein the display is display representing a direction from the position of the target device to the position of the user.

3. The information processing device according to claim 1, wherein the display is display having higher visibility for the user than another user not having the operation authority.

4. The information processing device according to claim 1, wherein the display is a line segment or a curved line connecting the user and the target device.

5. The information processing device according to claim 1, wherein
the target device includes a display unit, and
the display control unit is further configured to cause the display unit to display the display.

6. The information processing device according to claim 1, wherein the display control unit is further configured to cause a projecting device to project the display.

7. The information processing device according to claim 6, wherein
the projecting device includes a movable unit capable of changing a projecting direction,
the display control unit is further configured to change the projecting direction of the projecting device to change a projecting place for the display, and
the movable unit is implemented via at least one processor.

8. The information processing device according to claim 7, wherein the display control unit is further configured to determine the projecting place based on environment information concerning the real space.

9. The information processing device according to claim 8, wherein the environment information includes luminance, a color, or sound in the real space or depth information concerning an object forming the real space.

10. The information processing device according to claim 1, wherein the display control unit is further configured to change the display according to an angle formed by a straight line connecting the user having the operation authority and the target device and a straight line connecting another user not having the operation authority and the target device.

11. The information processing device according to claim 10, wherein, when the angle is larger than a predetermined angle, the display is displayed in a vicinity of the target device or to be superimposed on the target device and, when the angle is smaller than the predetermined angle, the display is displayed by a line segment or a curved line connecting the user and the target device.

12. The information processing device according to claim 5, wherein the display control unit is further configured to select, according to a ratio of a region where a display range of content displayed on the display unit of the target device occupies a display region of the display unit, whether to display the display in the display region of the display unit or display the display on an outer side of the display region.

13. The information processing device according to claim 12, wherein, when the display is displayed on the outer side of the display region, the display is projected by a projecting device.

14. The information processing device according to claim 1, wherein the selection of the target device is performed according to at least one of a gesture or a voice input of the user in a predetermined space.

15. The information processing device according to claim 4, wherein, when the user has the operation authority for a plurality of the target devices, the line segment or the curved line further includes a line segment or a curved line connecting the target devices.

16. The information processing device according to claim 4, wherein, when the operation authority is transferred from the user to another user, the display control unit is further configured to change display representing a direction from the position of the target device to the position of the user is present to display representing a direction in which the another user is.

17. The information processing device according to claim 7, wherein the display control unit is further configured to cause the projecting device to project the display to be superimposed on a housing of the target device or onto a vicinity of the housing of the target device.

18. An information processing method comprising
controlling, based on position information of a target device in a predetermined real space and position information of a user having an operation authority for the target device, display representing a positional relation between a position of the user and a position of the target device such that the user can visually recognize the display in the real space; and
controlling, based on selection of the target device, the display mutually associated with the user and the target device.

19. A non-transitory computer-readable medium having embodied thereon a program, which when executed by a computer causes the computer to execute an information processing method, the method comprising
controlling, based on position information of a target device in a predetermined real space and position information of a user having an operation authority for the target device, display representing a positional relation between a position of the user and a position of the target device such that the user can visually recognize the display in the real space; and
controlling, based on selection of the target device, the display mutually associated with the user and the target device.

* * * * *